(12) United States Patent
Bailey et al.

(10) Patent No.: US 9,807,221 B2
(45) Date of Patent: Oct. 31, 2017

(54) SYSTEMS, DEVICES, AND METHODS EFFECTED IN RESPONSE TO ESTABLISHING AND/OR TERMINATING A PHYSICAL COMMUNICATIONS LINK

(71) Applicant: THALMIC LABS INC., Kitchener (CA)

(72) Inventors: Matthew Bailey, Kitchener (CA); Aaron Grant, Kitchener (CA); Eric Philippe Bouchard, Waterloo (CA)

(73) Assignee: Thalmic Labs Inc., Kitchener (CA)

( * ) Notice: Subject to any disclaimer, the term of this patent is extended or adjusted under 35 U.S.C. 154(b) by 0 days.

(21) Appl. No.: 14/946,483

(22) Filed: Nov. 19, 2015

(65) Prior Publication Data

US 2016/0156762 A1 Jun. 2, 2016

Related U.S. Application Data

(60) Provisional application No. 62/085,385, filed on Nov. 28, 2014.

(51) Int. Cl.
*H04M 1/725* (2006.01)
*H04B 1/3827* (2015.01)
(Continued)

(52) U.S. Cl.
CPC ........ *H04M 1/72527* (2013.01); *H04B 1/385* (2013.01); *H04B 2001/3855* (2013.01);
(Continued)

(58) Field of Classification Search
CPC ........ H02J 5/005; H02J 7/025; H04B 5/0037; H04B 1/385; H04M 1/72527; H04W 76/046; H04W 76/021
See application file for complete search history.

(56) References Cited

U.S. PATENT DOCUMENTS 1,411,995 A 4/1922 Dull
3,620,208 A 11/1971 Higley et al.
(Continued)

FOREIGN PATENT DOCUMENTS

DE 44 12 278 A1 10/1995
EP 3 301 790 A2 2/1989
(Continued)

OTHER PUBLICATIONS

Communication pursuant to Rule 164(1) EPC, dated Sep. 30, 2016, for corresponding EP Application No. 14753949.8, 7 pages.
(Continued)

*Primary Examiner* — Edward Urban
*Assistant Examiner* — Max Mathew
(74) *Attorney, Agent, or Firm* — Seed IP Law Group LLP

(57) ABSTRACT

Systems, devices, and methods that are effected in or by an electronic device in response to establishing and/or terminating a physical communications link are described. An electronic device may be entered into deep sleep and may include a power control circuit that activates the device out of deep sleep in response to establishing a physical communications link with a source of electric power, such as another electronic device. Either in combination with or separate from this, an electronic device may establish wireless communications with another electronic device in response to establishing and terminating a physical communications link with the other electronic device. The physical communications link may be used to transfer device identity data from one device to the other and thereby bypass the cumbersome "discovery" process common to conventional wireless communication techniques. Portable electronic devices and personal computing devices that are operative to perform the above are described.

15 Claims, 8 Drawing Sheets

(51) Int. Cl.
  *H04W 76/02* (2009.01)
  *H04W 84/18* (2009.01)
  *H04L 29/12* (2006.01)

(52) U.S. Cl.
  CPC .. *H04B 2001/3861* (2013.01); *H04L 61/6022* (2013.01); *H04M 1/7253* (2013.01); *H04W 76/023* (2013.01); *H04W 84/18* (2013.01); *Y02B 60/50* (2013.01)

(56) References Cited

U.S. PATENT DOCUMENTS

| | | |
|---|---|---|
| 3,880,146 A | 4/1975 | Everett et al. |
| 4,602,639 A | 7/1986 | Hoogendoorn et al. |
| 4,817,064 A | 3/1989 | Milles |
| 5,003,978 A | 4/1991 | Dunseath, Jr. |
| D322,227 S | 12/1991 | Warhol |
| 5,081,852 A | 1/1992 | Cox |
| 5,251,189 A | 10/1993 | Thorp |
| D348,660 S | 7/1994 | Parsons |
| 5,445,869 A | 8/1995 | Ishikawa et al. |
| 5,482,051 A | 1/1996 | Reddy et al. |
| 5,605,059 A | 2/1997 | Woodward |
| 5,683,404 A | 11/1997 | Johnson |
| 6,032,530 A | 3/2000 | Hock |
| 6,184,847 B1 | 2/2001 | Fateh et al. |
| 6,238,338 B1 | 5/2001 | DeLuca et al. |
| 6,244,873 B1 | 6/2001 | Hill et al. |
| 6,377,277 B1 | 4/2002 | Yamamoto |
| D459,352 S | 6/2002 | Giovanniello |
| 6,487,906 B1 | 12/2002 | Hock |
| 6,510,333 B1 | 1/2003 | Licata et al. |
| 6,527,711 B1 | 3/2003 | Stivoric et al. |
| 6,619,836 B1 | 9/2003 | Silvant et al. |
| 6,720,984 B1 | 4/2004 | Jorgensen et al. |
| 6,743,982 B2 | 6/2004 | Biegelsen et al. |
| 6,807,438 B1 | 10/2004 | Brun Del Re et al. |
| D502,661 S | 3/2005 | Rapport |
| D502,662 S | 3/2005 | Rapport |
| 6,865,409 B2 | 3/2005 | Getsla et al. |
| D503,646 S | 4/2005 | Rapport |
| 6,880,364 B1 | 4/2005 | Vidolin et al. |
| 6,927,343 B2 | 8/2005 | Watanabe et al. |
| 6,965,842 B2 | 11/2005 | Rekimoto |
| 6,972,734 B1 | 12/2005 | Ohshima et al. |
| 6,984,208 B2 | 1/2006 | Zheng |
| 7,022,919 B2 | 4/2006 | Brist et al. |
| 7,086,218 B1 | 8/2006 | Pasach |
| D535,401 S | 1/2007 | Travis et al. |
| 7,173,437 B2 | 2/2007 | Hervieux et al. |
| 7,209,114 B2 | 4/2007 | Radley-Smith |
| D543,212 S | 5/2007 | Marks |
| 7,265,298 B2 | 9/2007 | Maghribi et al. |
| 7,271,774 B2 | 9/2007 | Puuri |
| 7,333,090 B2 | 2/2008 | Tanaka et al. |
| 7,450,107 B2 | 11/2008 | Radley-Smith |
| 7,491,892 B2 | 2/2009 | Wagner et al. |
| 7,517,725 B2 | 4/2009 | Reis |
| 7,558,622 B2 | 7/2009 | Tran |
| 7,596,393 B2 | 9/2009 | Jung et al. |
| 7,618,260 B2 | 11/2009 | Daniel et al. |
| 7,640,007 B2 | 12/2009 | Chen et al. |
| 7,660,126 B2 | 2/2010 | Cho et al. |
| 7,809,435 B1 | 10/2010 | Ettare et al. |
| 7,844,310 B2 | 11/2010 | Anderson |
| 7,870,211 B2 | 1/2011 | Pascal et al. |
| 7,925,100 B2 | 4/2011 | Howell et al. |
| 7,948,763 B2 | 5/2011 | Chuang |
| D643,428 S | 8/2011 | Janky et al. |
| D646,192 S | 10/2011 | Woode |
| 8,054,061 B2 | 11/2011 | Prance et al. |
| D654,622 S | 2/2012 | Hsu |
| 8,170,656 B2 | 5/2012 | Tan et al. |
| 8,179,604 B1 | 5/2012 | Prada Gomez et al. |
| 8,188,937 B1 | 5/2012 | Amafuji et al. |
| D661,613 S | 6/2012 | Demeglio |
| 8,203,502 B1 | 6/2012 | Chi et al. |
| 8,207,473 B2 | 6/2012 | Axisa et al. |
| 8,212,859 B2 | 7/2012 | Tang et al. |
| 8,355,671 B2 | 1/2013 | Kramer et al. |
| 8,389,862 B2 | 3/2013 | Arora et al. |
| 8,421,634 B2 | 4/2013 | Tan et al. |
| D682,727 S | 5/2013 | Bulgari |
| 8,447,704 B2 | 5/2013 | Tan et al. |
| 8,467,270 B2 | 6/2013 | Gossweiler, III et al. |
| 8,469,741 B2 | 6/2013 | Oster et al. |
| D689,862 S | 9/2013 | Liu |
| 8,591,411 B2 | 11/2013 | Banet et al. |
| D695,454 S | 12/2013 | Moore |
| 8,620,361 B2 | 12/2013 | Bailey et al. |
| 8,624,124 B2 | 1/2014 | Koo et al. |
| 8,702,629 B2 | 4/2014 | Giuffrida et al. |
| 8,704,882 B2 | 4/2014 | Turner |
| 8,777,668 B2 | 7/2014 | Ikeda et al. |
| D716,457 S | 10/2014 | Brefka et al. |
| D717,685 S | 11/2014 | Bailey et al. |
| 8,879,276 B2 | 11/2014 | Wang |
| 8,883,287 B2 | 11/2014 | Boyce et al. |
| 8,895,865 B2 | 11/2014 | Lenahan et al. |
| 8,912,094 B2 | 12/2014 | Koo et al. |
| 8,922,481 B1 | 12/2014 | Kauffmann et al. |
| 8,954,135 B2 | 2/2015 | Yuen et al. |
| 8,970,571 B1 | 3/2015 | Wong et al. |
| 8,971,023 B2 | 3/2015 | Olsson et al. |
| 9,018,532 B2 | 4/2015 | Wesselmann et al. |
| 9,086,687 B2 | 7/2015 | Park et al. |
| D736,664 S | 8/2015 | Paradise et al. |
| D741,855 S | 10/2015 | Park et al. |
| D742,272 S | 11/2015 | Bailey et al. |
| D742,874 S | 11/2015 | Cheng et al. |
| D743,963 S | 11/2015 | Osterhout |
| 9,211,417 B2 | 12/2015 | Heldman et al. |
| D747,714 S | 1/2016 | Erbeus |
| D750,623 S | 3/2016 | Park et al. |
| D751,065 S | 3/2016 | Magi |
| 9,299,248 B2 | 3/2016 | Lake et al. |
| D756,359 S | 5/2016 | Bailey et al. |
| 9,367,139 B2 | 6/2016 | Ataee et al. |
| 9,372,535 B2 | 6/2016 | Bailey et al. |
| 9,393,418 B2 | 7/2016 | Giuffrida et al. |
| 9,418,927 B2 | 8/2016 | Axisa et al. |
| 9,439,566 B2 | 9/2016 | Arne et al. |
| 9,477,313 B2 | 10/2016 | Mistry et al. |
| 9,529,434 B2 | 12/2016 | Choi et al. |
| 2002/0032386 A1 | 3/2002 | Sackner et al. |
| 2002/0077534 A1 | 6/2002 | DuRousseau |
| 2003/0036691 A1 | 2/2003 | Stanaland et al. |
| 2003/0051505 A1 | 3/2003 | Robertson et al. |
| 2003/0144586 A1 | 7/2003 | Tsubata |
| 2004/0068409 A1 | 4/2004 | Tanaka et al. |
| 2004/0073104 A1 | 4/2004 | Brun del Re et al. |
| 2004/0194500 A1 | 10/2004 | Rapport |
| 2004/0210165 A1 | 10/2004 | Marmaropoulos et al. |
| 2005/0005637 A1 | 1/2005 | Rapport |
| 2005/0012715 A1 | 1/2005 | Ford |
| 2005/0070227 A1* | 3/2005 | Shen .................... H04B 1/44 455/41.3 |
| 2005/0119701 A1 | 6/2005 | Lauter et al. |
| 2005/0177038 A1 | 8/2005 | Kolpin et al. |
| 2006/0037359 A1 | 2/2006 | Stinespring |
| 2006/0061544 A1 | 3/2006 | Min et al. |
| 2007/0132785 A1 | 6/2007 | Ebersole, Jr. et al. |
| 2007/0249286 A1* | 10/2007 | Ma ..................... G06F 19/327 455/41.3 |
| 2008/0136775 A1 | 6/2008 | Conant |
| 2009/0007597 A1 | 1/2009 | Hanevold |
| 2009/0031757 A1 | 2/2009 | Harding |
| 2009/0040016 A1 | 2/2009 | Ikeda |
| 2009/0051544 A1 | 2/2009 | Niknejad |
| 2009/0102580 A1 | 4/2009 | Uchaykin |
| 2009/0189867 A1 | 7/2009 | Krah et al. |
| 2009/0251407 A1 | 10/2009 | Flake et al. |
| 2009/0318785 A1 | 12/2009 | Ishikawa et al. |
| 2009/0326406 A1 | 12/2009 | Tan et al. |

(56) References Cited

U.S. PATENT DOCUMENTS

| | | |
|---|---|---|
| 2009/0327171 A1 | 12/2009 | Tan et al. |
| 2010/0041974 A1 | 2/2010 | Ting et al. |
| 2010/0280628 A1 | 11/2010 | Sankai |
| 2010/0293115 A1 | 11/2010 | Seyed Momen |
| 2010/0317958 A1 | 12/2010 | Beck et al. |
| 2010/0322214 A1* | 12/2010 | Workman ............... H04W 4/02 370/338 |
| 2011/0018754 A1 | 1/2011 | Tojima et al. |
| 2011/0134026 A1 | 6/2011 | Kang et al. |
| 2011/0166434 A1 | 7/2011 | Gargiulo |
| 2011/0172503 A1 | 7/2011 | Knepper et al. |
| 2011/0213278 A1 | 9/2011 | Horak et al. |
| 2011/0224556 A1 | 9/2011 | Moon et al. |
| 2011/0224564 A1 | 9/2011 | Moon et al. |
| 2012/0029322 A1 | 2/2012 | Wartena et al. |
| 2012/0051005 A1 | 3/2012 | Vanfleteren et al. |
| 2012/0101357 A1 | 4/2012 | Hoskuldsson et al. |
| 2012/0157789 A1 | 6/2012 | Kangas et al. |
| 2012/0165695 A1 | 6/2012 | Kidmose et al. |
| 2012/0188158 A1 | 7/2012 | Tan et al. |
| 2012/0203076 A1 | 8/2012 | Fatta et al. |
| 2012/0209134 A1 | 8/2012 | Morita et al. |
| 2012/0265090 A1 | 10/2012 | Fink et al. |
| 2012/0293548 A1 | 11/2012 | Perez et al. |
| 2012/0302858 A1 | 11/2012 | Kidmose et al. |
| 2012/0323521 A1 | 12/2012 | De Foras et al. |
| 2013/0005303 A1 | 1/2013 | Song et al. |
| 2013/0020948 A1* | 1/2013 | Han ................... H05B 37/0218 315/152 |
| 2013/0027341 A1 | 1/2013 | Mastandrea |
| 2013/0080794 A1 | 3/2013 | Hsieh |
| 2013/0127708 A1 | 5/2013 | Jung et al. |
| 2013/0165813 A1 | 6/2013 | Chang et al. |
| 2013/0191741 A1 | 7/2013 | Dickinson et al. |
| 2013/0198694 A1 | 8/2013 | Rahman et al. |
| 2013/0265229 A1 | 10/2013 | Forutanpour et al. |
| 2013/0265437 A1 | 10/2013 | Thörn et al. |
| 2013/0271292 A1* | 10/2013 | McDermott ...... G08G 1/096783 340/905 |
| 2013/0312256 A1 | 11/2013 | Wesselmann et al. |
| 2013/0317648 A1 | 11/2013 | Assad |
| 2013/0332196 A1 | 12/2013 | Pinsker |
| 2014/0020945 A1 | 1/2014 | Hurwitz et al. |
| 2014/0028546 A1 | 1/2014 | Jeon et al. |
| 2014/0045547 A1 | 2/2014 | Singamsetty et al. |
| 2014/0049417 A1 | 2/2014 | Abdurrahman et al. |
| 2014/0094675 A1 | 4/2014 | Luna et al. |
| 2014/0121471 A1 | 5/2014 | Walker |
| 2014/0122958 A1 | 5/2014 | Greenebrg et al. |
| 2014/0194062 A1 | 7/2014 | Palin et al. |
| 2014/0198034 A1 | 7/2014 | Bailey et al. |
| 2014/0198035 A1 | 7/2014 | Bailey et al. |
| 2014/0236031 A1 | 8/2014 | Banet et al. |
| 2014/0240103 A1 | 8/2014 | Lake et al. |
| 2014/0249397 A1 | 9/2014 | Lake et al. |
| 2014/0257141 A1 | 9/2014 | Giuffrida et al. |
| 2014/0282484 A1* | 9/2014 | Lazar ...................... G06F 8/65 717/173 |
| 2014/0285326 A1 | 9/2014 | Luna et al. |
| 2014/0299362 A1 | 10/2014 | Park et al. |
| 2014/0334083 A1 | 11/2014 | Bailey |
| 2014/0334653 A1 | 11/2014 | Luna et al. |
| 2014/0337861 A1 | 11/2014 | Chang et al. |
| 2014/0340857 A1 | 11/2014 | Hsu et al. |
| 2014/0349257 A1 | 11/2014 | Connor |
| 2014/0354528 A1 | 12/2014 | Laughlin et al. |
| 2014/0354529 A1 | 12/2014 | Laughlin et al. |
| 2014/0364703 A1 | 12/2014 | Kim et al. |
| 2014/0375465 A1 | 12/2014 | Fenuccio et al. |
| 2015/0011857 A1 | 1/2015 | Henson et al. |
| 2015/0025355 A1 | 1/2015 | Bailey et al. |
| 2015/0051470 A1 | 2/2015 | Bailey et al. |
| 2015/0057506 A1 | 2/2015 | Luna et al. |
| 2015/0057770 A1 | 2/2015 | Bailey et al. |
| 2015/0065840 A1 | 3/2015 | Bailey |
| 2015/0084860 A1 | 3/2015 | Aleem et al. |
| 2015/0106052 A1 | 4/2015 | Balakrishnan et al. |
| 2015/0109202 A1 | 4/2015 | Ataee et al. |
| 2015/0124566 A1 | 5/2015 | Lake et al. |
| 2015/0141784 A1 | 5/2015 | Morun et al. |
| 2015/0148641 A1 | 5/2015 | Morun et al. |
| 2015/0160621 A1 | 6/2015 | Yilmaz |
| 2015/0182113 A1 | 7/2015 | Utter, II |
| 2015/0182130 A1 | 7/2015 | Utter, II |
| 2015/0182163 A1 | 7/2015 | Utter |
| 2015/0182164 A1 | 7/2015 | Utter, II |
| 2015/0186609 A1 | 7/2015 | Utter, II |
| 2015/0216475 A1 | 8/2015 | Luna et al. |
| 2015/0230756 A1 | 8/2015 | Luna et al. |
| 2015/0234426 A1 | 8/2015 | Bailey et al. |
| 2015/0237716 A1 | 8/2015 | Su et al. |
| 2015/0261306 A1 | 9/2015 | Lake |
| 2015/0277575 A1 | 10/2015 | Ataee et al. |
| 2015/0296553 A1 | 10/2015 | DiFranco et al. |
| 2015/0325202 A1 | 11/2015 | Lake et al. |
| 2015/0326317 A1* | 11/2015 | Michaelis ............ H04B 10/807 398/115 |
| 2015/0370333 A1 | 12/2015 | Ataee et al. |
| 2016/0020500 A1 | 1/2016 | Matsuda |
| 2016/0150636 A1 | 5/2016 | Otsubo |
| 2016/0199699 A1 | 7/2016 | Klassen |
| 2016/0202081 A1 | 7/2016 | Debieuvre et al. |
| 2016/0274758 A1 | 9/2016 | Bailey |
| 2016/0309249 A1 | 10/2016 | Wu et al. |
| 2016/0313899 A1 | 10/2016 | Noel |

FOREIGN PATENT DOCUMENTS

| | | |
|---|---|---|
| JP | 2009-50679 A | 3/2009 |
| KR | 20120094870 A | 8/2012 |
| KR | 20120097997 A | 9/2012 |
| WO | 2011/070554 A2 | 6/2011 |

OTHER PUBLICATIONS

Costanza et al., "EMG as a Subtle Input Interface for Mobile Computing," Mobile HCI 2004, LNCS 3160, edited by S. Brewster and M. Dunlop, Springer-Verlag Berlin Heidelberg, pp. 426-430, 2004.

Costanza et al., "Toward Subtle Intimate Interfaces for Mobile Devices Using an EMG Controller," CHI 2005, Proceedings of the SIGCHI Conference on Human Factors in Computing Systems, pp. 481-489, 2005.

Ghasemzadeh et al., "A Body Sensor Network With Electromyogram and Inertial Sensors: Multimodal Interpretation of Muscular Activities," IEEE Transactions on Information Technology in Biomedicine, vol. 14, No. 2, pp. 198-206, Mar. 2010.

Gourmelon et al., "Contactless sensors for Surface Electromyography," Proceedings of the 28th IEEE EMBS Annual International Conference, New York City, NY, Aug. 30-Sep. 3, 2006, pp. 2514-2517.

International Search Report and Written Opinion, dated May 16, 2014, for corresponding International Application No. PCT/US2014/017799, 9 pages.

International Search Report and Written Opinion, dated Aug. 21, 2014, for corresponding International Application No. PCT/US2014/037863, 10 pages.

International Search Report and Written Opinion, dated Nov. 21, 2014, for corresponding International Application No. PCT/US2014/052143, 9 pages.

International Search Report and Written Opinion, dated Feb. 27, 2015, for corresponding International Application No. PCT/US2014/067443, 10 pages.

International Search Report and Written Opinion, dated May 27, 2015, for corresponding International Application No. PCT/US2015/015675, 9 pages.

Morris et al., "Emerging Input Technologies for Always-Available Mobile Interaction," *Foundations and Trends in Human-Computer Interaction* 4(4):245-316, 2010. (74 total pages).

(56) References Cited

OTHER PUBLICATIONS

Naik et al., "Real-Time Hand Gesture Identification for Human Computer Interaction Based on ICA of Surface Electromyogram," IADIS International Conference Interfaces and Human Computer Interaction 2007, 8 pages.

Picard et al., "Affective Wearables," Proceedings of the IEEE 1st International Symposium on Wearable Computers, ISWC, Cambridge, MA, USA, Oct. 13-14, 1997, pp. 90-97.

Rekimoto, "GestureWrist and GesturePad: Unobtrusive Wearable Interaction Devices," ISWC '01 Proceedings of the 5th IEEE International Symposium on Wearable Computers, 2001, 7 pages.

Saponas et al., "Making Muscle-Computer Interfaces More Practical," CHI 2010, Atlanta, Georgia, USA, Apr. 10-15, 2010, 4 pages.

Sato et al., "Touche. Enhancing Touch Interaction on Humans, Screens, Liquids, and Everyday Objects," CHI' 12, May 5-10, 2012, Austin, Texas.

Ueno et al., "A Capacitive Sensor System for Measuring Laplacian Electromyogram through Cloth: A Pilot Study," Proceedings of the 29th Annual International Conference of the IEEE EMBS, Cite Internationale, Lyon, France, Aug. 23-26, 2007.

Ueno et al., "Feasibility of Capacitive Sensing of Surface Electromyographic Potential through Cloth," *Sensors and Materials* 24(6):335-346, 2012.

Xiong et al., "A Novel HCI based on EMG and IMU," Proceedings of the 2011 IEEE International Conference on Robotics and Biomimetics, Phuket, Thailand, Dec. 7-11, 2011, 5 pages.

Zhang et al., "A Framework for Hand Gesture Recognition Based on Accelerometer and EMG Sensors," IEEE Transactions on Systems, Man, and Cybernetics—Part A: Systems and Humans, vol. 41, No. 6, pp. 1064-1076, Nov. 2011.

Xu et al., "Hand Gesture Recognition and Virtual Game Control Based on 3D Accelerometer and EMG Sensors," Proceedings of the 14th international conference on Intelligent user interfaces, Sanibel Island, Florida, Feb. 8-11, 2009, 401-406.

Brownlee, "Finite State Machines (FSM): Finite state machines as a control technique in Artificial Intelligence (AI)," Jun. 2002, 12 pages.

\* cited by examiner

SYSTEMS, DEVICES, AND METHODS EFFECTED IN RESPONSE TO ESTABLISHING AND/OR TERMINATING A PHYSICAL COMMUNICATIONS LINK

BACKGROUND

Technical Field

The present systems, devices, and methods generally relate to portable electronic devices and particularly relate to triggering specific actions of a portable electronic device in response to establishing/terminating a physical communications link at a tethered connector port of the portable electronic device.

Description of the Related Art

Portable and Wearable Electronic Devices

Electronic devices are commonplace throughout most of the world today. Advancements in integrated circuit technology have enabled the development of electronic devices that are sufficiently small and lightweight to be carried by the user. Such "portable" electronic devices may include on-board power supplies (such as batteries or other power storage systems) and may be designed to operate without any wire-connections to other electronic systems; however, a small and lightweight electronic device may still be considered portable even if it includes a wire-connection to another electronic system. For example, a microphone may be considered a portable electronic device whether it is operated wirelessly or through a wire-connection.

The convenience afforded by the portability of electronic devices has fostered a huge industry. Smartphones, audio players, laptop computers, tablet computers, and ebook readers are all examples of portable electronic devices. However, the convenience of being able to carry a portable electronic device has also introduced the inconvenience of having one's hand(s) encumbered by the device itself. This problem is addressed by making an electronic device not only portable, but wearable.

A wearable electronic device is any portable electronic device that a user can carry without physically grasping, clutching, or otherwise holding onto the device with their hands. For example, a wearable electronic device may be attached or coupled to the user by a strap or straps, a band or bands, a clip or clips, an adhesive, a pin and clasp, an article of clothing, tension or elastic support, an interference fit, an ergonomic form, etc. Examples of wearable electronic devices include digital wristwatches, electronic armbands, electronic rings, electronic ankle-bracelets or "anklets," head-mounted electronic display units, hearing aids, and so on.

Wireless Communications

As described above, a portable electronic device may be designed to operate, at least in some modes, without any wire-connections to other electronic devices. The exclusion of external wire-connections enhances the portability of a portable electronic device. In order to interact with other electronic devices in the absence of external wire-connections, portable electronic devices (i.e., wearable or otherwise) commonly employ wireless communication techniques. A person of skill in the art will be familiar with common wireless communication protocols, such as Bluetooth®, ZigBee®, WiFi®, Near Field Communication (NFC), and the like.

There are specific challenges that arise in wireless communications that are not encountered in wire-based communications. For example, establishing a direct and isolated communicative link (i.e., a "connection" or a "communications session") between two electronic devices is quite straightforward in wire-based communications: connect a first end of a wire to a first device and a second end of the wire to a second device. Conversely, the same thing is much less straightforward in wireless communications. Wireless signals are typically broadcast out in the open and may impinge upon any and all electronic devices within range. In order to limit a wireless connection to be between specific electronic devices (e.g., between a specific pair of electronic devices), the wireless signals themselves are typically configured, through a lengthy process, to be receivable, accessible, or usable by only the specific device(s) by which the signals are intended to be received. For example, wireless signals may be encrypted and an intended receiving device may be configured to decrypt the signals, and/or wireless signals may be appended with "device ID" information (i.e., an identifier that identifies the intended receiving device) that causes only the device bearing the matching "device ID" to respond to the wireless signal. This signal configuration process is lengthy at least in part because it is all done wirelessly, beginning with wireless signals that are accessible by all devices within range and gradually evolving towards wireless signals that are only accessible (without reverse engineering) by the specific devices involved in the wireless connection.

Wireless connections are advantageous in portable electronic devices because wireless connections enable a portable electronic device to interact with a wide variety of other devices without being encumbered by wire connections. In other words, wireless connections enhance the portability of a portable electronic device. However, significant signal preparation is usually necessary in order to establish a wireless communications session between two electronic devices. This is especially true for the first time two electronic devices wirelessly communicate with one another. Typically, establishing a new wireless connection requires the user to manually enter a first device into a "discoverable mode" in which the first device wirelessly transmits information about itself and manually enter a second device into a "discovery mode" in which the second device searches for wireless signals from other devices that are in discoverable mode. This discovery process is unduly time consuming and can become frustrating for the user when, for example, the second device is not able to discover the first device. The advantages of device portability and communicative versatility afforded by wireless connections are diminished by the extended effort that is often required to establish a new wireless communications session. There remains a need in the art for systems, devices, and methods that facilitate the establishing of wireless communications.

BRIEF SUMMARY

A method of establishing wireless communications between a first electronic device and a second electronic device may be summarized as including: receiving by the second electronic device from the first electronic device, via a physical communications link between the first and the second electronic devices, a first identifier that identifies the first electronic device; in response to a termination of the physical communications link between the first and the second electronic devices, wirelessly transmitting by the second electronic device a request to initiate a wireless communications session, wherein the request to initiate a wireless communications session includes a representation of the first identifier that identifies the first electronic device; and establishing the wireless communications session with the first electronic device by the second electronic device. The method may further include transmitting electric power from the second electronic device to the first electronic device via the physical communications link between the first and the second electronic devices; and causing the first electronic device to wake from a deep sleep mode.

Receiving by the second electronic device from the first electronic device, via a physical communications link between the first and the second electronic devices, a first identifier that identifies the first electronic device may include retrieving the first identifier by the second electronic device from a non-transitory storage medium of the first electronic device via the physical communications link between the first and the second electronic devices. Receiving by the second electronic device from the first electronic device, via a physical communications link between the first and the second electronic devices, a first identifier that identifies the first electronic device may include receiving by the second electronic device from the first electronic device, via a physical communications link between the first and the second electronic devices, a media access control ("MAC") address of the first electronic device.

The method may further include wirelessly receiving by the second electronic device an acceptance of the request to initiate the wireless communications session by the first electronic device based on inclusion of the first identifier that identifies the first electronic device in the request to initiate the wireless communications session. Receiving by the second electronic device from the first electronic device, via a physical communications link between the first and the second electronic devices, a first identifier that identifies the first electronic device may include receiving by the second electronic device from the first electronic device, via the physical communications link between the first and the second electronic devices, the first identifier that identifies the first electronic device in response to an establishing of the physical communications link between the first and the second electronic devices.

A method of initiating wireless communications with a first electronic device by a second electronic device may be summarized as including: in response to an establishing of a physical communications link between the first and the second electronic devices, receiving by the second electronic device from the first electronic device, via the physical communications link between the first and the second electronic devices, a first identifier that identifies the first electronic device; and in response to a termination of the physical communications link between the first and the second electronic devices, wirelessly transmitting by the second electronic device a request to initiate a wireless communications session, wherein the request to initiate a wireless communications session includes a representation of the first identifier that identifies the first electronic device. The method may further include transmitting electric power from the second electronic device to the first electronic device via the physical communications link between the first and the second electronic devices; and causing the first electronic device to wake from a deep sleep mode.

Receiving by the second electronic device from the first electronic device, via the physical communications link between the first and the second electronic devices, a first identifier that identifies the first electronic device may include retrieving the first identifier by the second electronic device from a non-transitory storage medium of the first electronic device via the physical communications link between the first and the second electronic devices. Receiving by the second electronic device from the first electronic device, via the physical communications link between the first and the second electronic devices, a first identifier that identifies the first electronic device may include receiving by the second electronic device from the first electronic device, via the physical communications link between the first and the second electronic devices, a media access control ("MAC") address of the first electronic device.

An electronic device may be summarized as including: a tethered connector port; a wireless transceiver; a processor; and a non-transitory processor-readable storage medium communicatively coupled to each of the tethered connector port, the wireless transceiver, and the processor, wherein the non-transitory processor-readable storage medium stores processor-executable wireless communications initiation instructions that, when executed by the processor, cause the electronic device to: receive by the tethered connector port, via a physical communications link between the electronic device and another electronic device, an identifier that identifies the other electronic device; in response to a termination of the physical communications link between the electronic device and the other electronic device, wirelessly transmit by the wireless transceiver a request to initiate a wireless communications session with the other electronic device, wherein the request to initiate a wireless communications session includes a representation of the identifier that identifies the other electronic device; and establish the wireless communications session with the other electronic device. The electronic device may further include a second tethered connector port and the wireless transceiver may be plugged in to the second tethered connector port. The processor-executable wireless communication initiation instructions that, when executed by the processor, cause the electronic device to receive by the tethered connector port, via a physical communications link between the electronic device and another electronic device, an identifier that identifies the other electronic device, may cause the electronic device to retrieve, via the physical communications link between the electronic device and another electronic device, the identifier that identifies the other electronic device.

A method of establishing wireless communications between a first electronic device and a second electronic device may be summarized as including: providing by the first electronic device to the second electronic device, via a physical communications link between the first and the second electronic devices, a first identifier that identifies the first electronic device; in response to a termination of the physical communications link between the first and the second electronic devices, wirelessly receiving by the first electronic device from the second electronic device a request to initiate a wireless communications session, wherein the request to initiate a wireless communications session includes a representation of the first identifier that identifies the first electronic device; and establishing the wireless communications session with the second electronic device by the first electronic device. The method may further include receiving electric power from the second electronic device by the first electronic device via the physical communications link between the first and the second electronic devices; and in response to receiving electric power from the second electronic device by the first electronic device via the physical communications link between the first and the second electronic devices, waking from a deep sleep mode by the first electronic device.

Providing by the first electronic device to the second electronic device, via a physical communications link between the first and the second electronic devices, a first identifier that identifies the first electronic device may include providing the second electronic device access to a non-transitory storage medium of the first electronic device via the physical communications link between the first and the second electronic devices. Providing by the first electronic device to the second electronic device, via a physical communications link between the first and the second electronic devices, a first identifier that identifies the first electronic device may include providing by the first electronic device to the second electronic device, via a physical communications link between the first and the second electronic devices, a media access control ("MAC") address of the first electronic device. Establishing the wireless communications session with the second electronic device by the first electronic device may include wirelessly transmitting by the first electronic device an acceptance of the request to initiate the wireless communications session by the first electronic device based on inclusion of the first identifier that identifies the first electronic device in the request to initiate the wireless communications session. Providing by the first electronic device to the second electronic device, via a physical communications link between the first and the second electronic devices, a first identifier that identifies the first electronic device may include providing by the first electronic device to the second electronic device, via the physical communications link between the first and the second electronic devices, the first identifier that identifies the first electronic device in response to an establishing of the physical communications link between the first and the second electronic devices.

An electronic device may be summarized as including: a tethered connector port; a wireless transceiver; a processor; and a non-transitory processor-readable storage medium communicatively coupled to the processor and at least the tethered connector port, wherein the non-transitory processor-readable storage medium stores i) an identifier that identifies the electronic device, and ii) processor-executable wireless communication instructions that, when executed by the processor, cause the electronic device to: provide another electronic device, via a physical communications link between the electronic device and the other electronic device, the identifier that identifies the electronic device; in response to a termination of the physical communications link between the electronic device and the other electronic device, wirelessly receive from the other electronic device a request to initiate a wireless communications session, wherein the request to initiate a wireless communications session includes a representation of the identifier that identifies the electronic device; and establish the wireless communications session with the other electronic device. The processor-executable wireless communication instructions that, when executed by the processor, cause the electronic device to provide another electronic device, via a physical communications link between the electronic device and the other electronic device, the identifier that identifies the electronic device may cause, when executed by the processor, the electronic device to provide the other electronic device with access to the non-transitory processor-readable storage medium that stores the identifier that identifies the electronic device. The processor-executable wireless communication instructions, when executed by the processor, may further cause the electronic device to: wirelessly transmit an acceptance of the request to initiate the wireless communications session based on inclusion of the identifier that identifies the electronic device in the request to initiate the wireless communications session.

The electronic device may include a device selected from the group consisting of: a portable electronic device and a wearable electronic device. The identifier that identifies the electronic device may include a media access control ("MAC") address of the electronic device.

A method of establishing wireless communications between a first electronic device and a second electronic device may be summarized as including: providing by the first electronic device to the second electronic device, via a physical communications link between the first and the second electronic devices, access to a first identifier that identifies the first electronic device; receiving by the second electronic device from the first electronic device, via the physical communications link between the first and the second electronic devices, the first identifier that identifies the first electronic device; in response to a termination of the physical communications link between the first and the second electronic devices, wirelessly transmitting by the second electronic device a request to initiate a wireless communications session, wherein the request to initiate a wireless communications session includes a representation of the first identifier that identifies the first electronic device; wirelessly receiving the request to initiate the wireless communications session by the first electronic device; in response to wirelessly receiving the request to initiate the wireless communications session by the first electronic device and based on inclusion of the representation of the first identifier that identifies the first electronic device in the request to initiate a wireless communications session, wirelessly transmitting by the first electronic device an acceptance of the request to initiate the wireless communications session; wirelessly receiving the acceptance of the request to initiate the wireless communications session by the second electronic device; and in response to wirelessly receiving the acceptance of the request to initiate the wireless communications session by the second electronic device, establishing the wireless communications session between the first electronic device and the second electronic device.

The method may further include transmitting electric power from the second electronic device via the physical communications link between the first and the second electronic devices; receiving electric power by the first electronic device via the physical communications link between the first and the second electronic devices; and in response to receiving electric power by the first electronic device via the physical communications link between the first and the second electronic devices, waking from a deep sleep mode by the first electronic device. Providing by the first electronic device to the second electronic device, via a physical communications link between the first and the second electronic devices, a first identifier that identifies the first electronic device may include providing by the first electronic device to the second electronic device, via the physical communications link between the first and the second electronic devices, the first identifier that identifies the first electronic device in response to an establishing of the physical communications link between the first and the second electronic devices.

A method of activating a portable electronic device out of deep sleep, wherein the portable electronic device includes a processor, a power storage component; a switch communicatively coupleable to both the processor and the power storage component and which is controllably switchable between a first state in which the power storage component and the processor are communicatively isolated from one another and a second state in which the power storage component and the processor are communicatively coupled to one another, and a tethered connector port communicatively coupled to the processor, and wherein the portable electronic device is in a deep sleep mode in which i) the power storage component is at least partially charged, and ii) the switch is in the first state in which the power storage component and the processor are communicatively isolated from one another, may be summarized as including: in response to an establishing of a physical communications link between the tethered connector port and a source of electric power, triggering the switch into the second state in which the power storage component and the processor are communicatively coupled to one another. The portable electronic device may include a wireless transceiver and the source of electric power may include another electronic device, and the method may further include providing by the portable electronic device to the other electronic device, via the physical communications link between the portable electronic device and the other electronic device, an identifier that identifies the portable electronic device. The method may further include: in response to a termination of the physical communications link between the portable electronic device and the other electronic device, wirelessly receiving by the portable electronic device from the other electronic device a request to initiate a wireless communications session, wherein the request to initiate a wireless communications session includes a representation of the identifier that identifies the portable electronic device; and establishing the wireless communications session with the other electronic device by the portable electronic device.

A portable electronic device may be summarized as including a processor; a power storage component, wherein the power storage component is at least partially charged and the power storage component and the processor are communicatively isolated from one another; a tethered connector port; and a power control circuit that communicatively couples to the processor, the power storage component, and the tethered connector port, wherein the power control circuit includes at least one switch, and wherein in response to an establishing of a physical communications link between the tethered connector port and a source of electric power, the at least one switch communicatively couples the processor and the power storage component to one another. The portable electronic device may include a wearable electronic device. The portable electronic device may further include: a non-transitory storage medium communicatively coupled to at least the first tethered connector port, wherein the non-transitory storage medium stores an identifier that identifies the portable electronic device, and wherein in response to the establishing of the physical communications link between the tethered connector port and the source of electric power, the portable electronic device provides the identifier via the physical communications link.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

Figure 1:
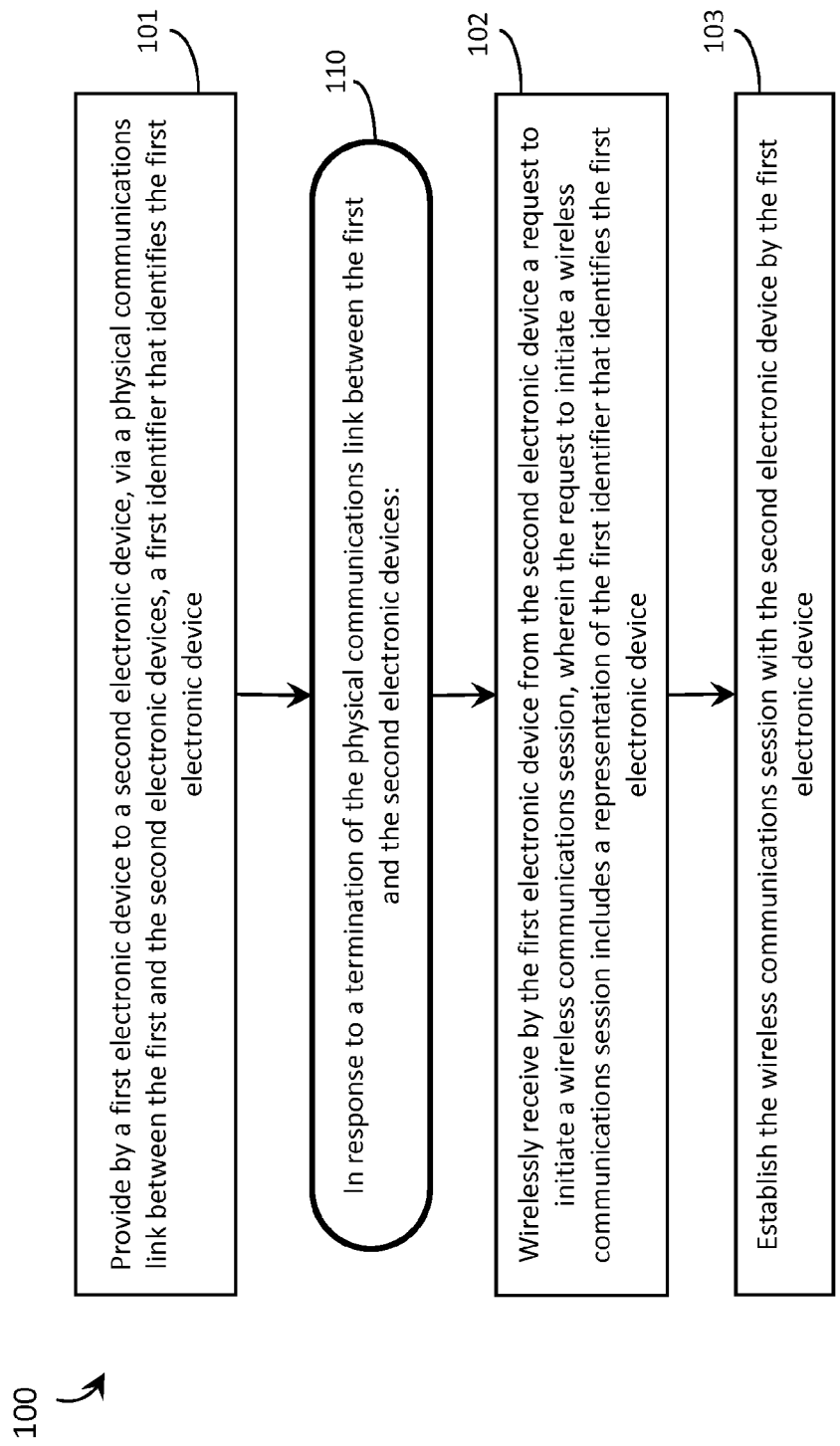
FIG. 1 is a flow-diagram showing a method of establishing wireless communications between a first electronic device and a second electronic device in accordance with the present systems, devices, and methods, from the point of view of the first electronic device.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with electronic devices, and in particular portable electronic devices such as wearable electronic devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

Portable electronic devices are ubiquitous throughout the world today, and the portability of such devices is significantly enhanced by the ability to communicate with other devices via wireless connections. However, the process of establishing a wireless connection is typically slow, cumbersome, and requires specific input(s) from the user. As described previously, the difficulty of establishing wireless connections by conventional, wireless means is due, at least in part, to the need to transition from an open, public "discovery" mode to a closed, private "paired" or "connected" mode via only the exchange of wireless signals. The various embodiments described herein provide systems, devices, and methods that initiate wireless communications sessions between electronic devices easily, securely, and substantially autonomously in response to establishing and then terminating a physical communications link therebetween.

Throughout this specification and the appended claims, the terms "wireless connection" and "wireless communications session" are used, substantially interchangeably, to refer to a direct communicative link between at least two electronic devices that employs one or more wireless communication protocol(s), such as Bluetooth®, ZigBee®, WiFi®, Near Field Communication (NFC), or similar. In the art, a wireless connection or communications session is typically established by communicatively linking two devices through a process called "pairing."

FIG. 1 is a flow-diagram showing a method 100 of establishing wireless communications between a first electronic device and a second electronic device in accordance with the present systems, devices, and methods, from the point of view of the first electronic device. Advantageously, the first electronic device is a portable electronic device (e.g., a wearable electronic device) and the second electronic device is or includes an electronic receiver or electronic receiving device. Throughout this specification and the appended claims, the terms "electronic receiver" and "electronic receiving device" are used substantially interchangeably to denote any electronic device that includes at least a wireless receiver (e.g., as part of a wireless transceiver) that, in use, receives wireless signals. As used herein, an electronic receiving device supports at least wireless receiving functionality and may, in addition, include any number of additional functionalities including, but not limited to, wireless transmitting functionality. Examples of electronic receiving devices that are particularly well-suited for use as the "second electronic device" in method 100 include, without limitation: a laptop computer, a personal computer, and/or a desktop computer.

Method 100 includes three acts 101, 102, and 103 (depicted by rectangular boxes in FIG. 1) and one criterion 110 (depicted by a rounded box in FIG. 1), where acts 102 and 103 are only performed when criterion 110 is satisfied. Thus, FIG. 1 depicts an implementation of method 100 for which criterion 110 is satisfied. Those of skill in the art will appreciate that in alternative embodiments certain acts and/or criteria may be omitted and/or additional acts and/or criteria may be added. Those of skill in the art will also appreciate that the illustrated order of the acts and criterion is shown for exemplary purposes only and may change in alternative embodiments.

At 101, the first electronic device (i.e., the portable electronic device) provides a first identifier to the second electronic device via a physical communications link between the first and the second electronic devices. The first identifier identifies the first electronic device and may include, for example, a media access control ("MAC") address of the first electronic device (or of a component thereof, such as a processor thereof). The first identifier may be stored in a non-transitory storage medium or memory of the first electronic device and providing the first identifier to the second electronic device at 101 may include, for example, providing the second electronic device access to the non-transitory storage medium where the first identifier is stored via the physical communications link between the first and the second electronic devices.

Act 101 begins the process of establishing a wireless connection between two electronic devices by making use of a physical, wired connection between the devices to deliver information relevant to wireless communications. By providing the first identifier via the physical communications link between the first and the second electronic devices, the first electronic device effectively enables the second electronic device to "discover" the first electronic device through a wired connection as opposed to through a conventional wireless discovery process. Thus, act 101 quickly accomplishes (or even bypasses) at least a portion of the conventional discovery process and enables the second electronic device to immediately transmit wireless signals that are configured to be accessed by the first electronic device without the second electronic device first having to "wirelessly discover" the first electronic device or explore the wireless signal space to pick out and identify the first electronic device.

Depending on the specific implementation, act 101 may make use of an existing physical communications link between the first and the second electronic devices, or act 101 may be triggered substantially autonomously in response to an establishing of (i.e., a formation or creation of) the physical communications link between the first and the second electronic devices. For example, act 101 may be triggered substantially autonomously by the first electronic device in response to the user plugging a first end of a cable into a tethered connector port of the first electronic device and a second end of the cable into a tethered connector port of the second electronic device. The tethered connector ports and the cable (i.e., the physical communications link) may take on any of a variety of different forms, including any or all of (e.g., exclusively or in combination): Universal Serial Bus ("USB") port(s)/cable, mini-USB port(s)/cable, micro-USB port(s)/cable, THUNDERBOLT® port(s)/cable, and the like.

Throughout this specification and the appended claims, the term "autonomously" is used to describe a process that is carried out substantially automatically (i.e., without user intervention) by one or more electronic device(s). Such an autonomous process may, in accordance with the present systems, devices, and methods, be triggered in response to one or more condition(s) or criteria being satisfied, and it is to be understood that any act(s) involved in satisfying the one or more condition(s) or criteria may or may not be accomplished autonomously. Returning to the example described above, act 101 of method 100 may be performed substantially autonomously by the first electronic device in response to an establishing of a physical communications link between the first and the second electronic devices. In this scenario, act 101 may be performed substantially autonomously by the first electronic device even though the act of actually establishing the physical communications link between the first and the second electronic devices may itself involve intervention from the user.

At 110, a criterion is specified and this criterion must be met before method 100 proceeds to act 102. The criterion is that the physical communications link between the first and the second electronic devices must be terminated. Method 100 only proceeds to acts 102 and 103 in response to a termination of the physical communications link between the first and the second electronic devices. While acts 102 and 103 may be performed substantially autonomously by the first electronic device, criterion 110 may, in some implementations, involve the user physically unplugging a cable (e.g., a USB cable) from either or both of the first and the second electronic devices.

As previously described, FIG. 1 depicts an implementation of method 100 in which criterion 110 is satisfied. Accordingly, method 100 proceeds to act 102.

At 102, the first electronic device wirelessly receives a request to initiate a wireless communications session from the second electronic device. The request to initiate a wireless communications session includes a representation of (e.g., the entirety of, or data that is based on and/or representative of) the first identifier that was provided by the first electronic device to the second electronic device at 101. For the sake of simplicity, hereafter the term "first identifier" is used to encompass the first identifier in its entirety and a representation of the first identifier comprising data that is based on and/or representative of the first identifier. In wireless connection terms, act 101 enables the first electronic device to be readily discovered by the second electronic device and at 102 the first electronic device receives a request to initiate a wireless communications session because the first electronic device has been discovered by the second electronic device. Receipt of the request to initiate a wireless communications session at 102 is triggered in response to a termination of the physical communications link between the first and the second electronic devices because, in common implementations, two electronic devices are not typically capable of sustaining both a wired connection and a wireless connection between one another at the same time. However, a person of skill in the art will appreciate that in implementations that are capable of sustaining simultaneous wired and wireless connections, method 100 may be performed without reliance upon (or even the inclusion of) criterion 110.

At 103, the wireless communications session with the second electronic device is established by the first electronic device. Establishing the wireless communications session by the first electronic device may include, for example, wirelessly transmitting by the first electronic device an acceptance of the request to initiate the wireless communications session, where the acceptance is based on the inclusion of the first identifier in the request to initiate the wireless communications session. Upon acceptance of the request to initiate the wireless communications session, the two electronic devices become paired and/or connected and proceed to communicate wirelessly in accordance with known wireless communication protocols, such as Bluetooth®, WiFi®, Zigbee®, or the like.

In principle, method 100 may be carried out using any wirelessly communicative electronic device as the first electronic device; however, as will be discussed in more detail later on, method 100 is particularly advantageous in implementations in which the first electronic device is a portable electronic device, such as a wearable electronic device. An example of a wearable electronic device that is particularly well-suited to serve the role of the first electronic device in method 100 is now provided.

Figure 2:
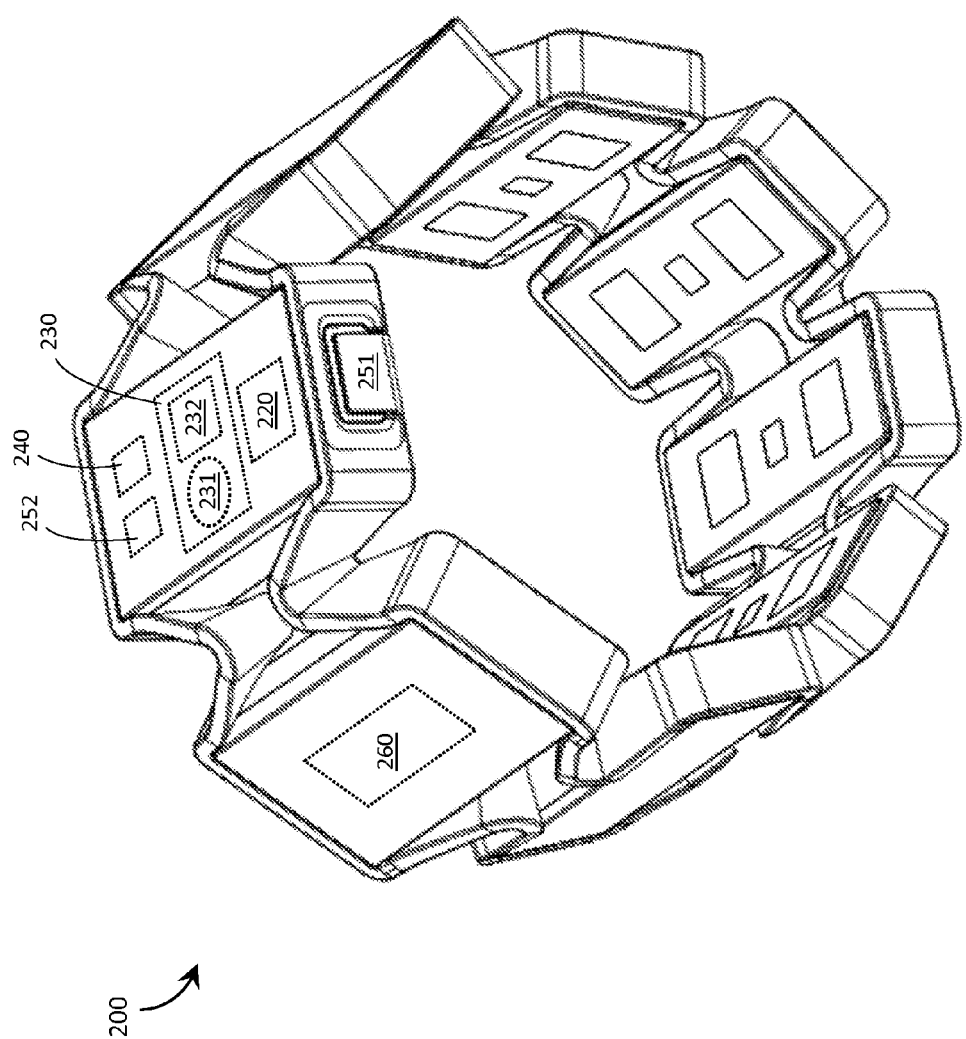
FIG. 2 is a perspective view of an exemplary wearable gesture identification device that is well-suited to serve as the "first electronic device" in the method from FIG. 1 and performs the acts therefrom in order to establish a wireless communications session in accordance with the present systems, devices, and methods.

FIG. 2 is a perspective view of an exemplary wearable gesture identification device 200 that is well-suited to serve as the "first electronic device" in method 100 and performs acts 101, 102, and 103 in order to establish a wireless communications session in accordance with the present systems, devices, and methods. Device 200 is an armband designed to be worn on the forearm of a user, though a person of skill in the art will appreciate that the teachings described herein may readily be applied in wearable electronic devices designed to be worn elsewhere on the body of the user, including without limitation: on the upper arm, wrist, hand, finger, leg, foot, torso, or neck of the user (or indeed, in non-wearable portable electronic devices and in non-portable electronic devices). Some details that may be included in exemplary wearable gesture identification device 200 are described in at least U.S. Non-Provisional patent application Ser. No. 14/186,889 (now US Patent Application Publication No. 2014-0240103), U.S. Non-Provisional patent application Ser. No. 14/276,575 (now US Patent Application Publication No. 2014-0334083), U.S. Provisional Patent Application Ser. No. 61/909,786 (now US Patent Application Publication No. 2015-0148641), U.S. Provisional Patent Application Ser. No. 62/031,651 (now US Patent Application Publication No. 2015-0234426), U.S. Provisional Patent Application Ser. No. 61/971,346 (now US Patent Application Publication No. 2015-0277575), and U.S. Non-Provisional patent application Ser. No. 14/465,194 (now US Patent Application Publication No. 2015-0057770), each of which is incorporated herein by reference in its entirety. Device 200 is operable to detect, sense, or measure when the user performs a physical gesture with the hand or arm upon which device 200 is worn, to identify the user-performed gesture, and to wirelessly transmit at least one signal based on the identity of the user-performed gesture. However, device 200 is used herein only as an illustrative example of a "first electronic device" and details of the gesture identification functionality are outside of the scope of the present systems, devices, and methods.

Wearable gesture identification device 200 includes at least the minimum components necessary in order to perform the acts of the "first electronic device" in method 100 in accordance with the present systems, devices, and methods. Thus, device 200 includes at least a tethered connector port 251 (a micro-USB port in exemplary device 200, though illustrated with an insulative plug inserted therein in FIG. 2), a wireless transceiver 252, a processor 220, and a non-transitory storage medium or memory 230 communicatively coupled (either directly or through one or more intervening communicative couplings) to at least both the processor 220 and the tethered connector port 251. Non-transitory storage medium 230 stores an identifier 231 that identifies device 200 (i.e., the first identifier as described in method 100), such as a MAC address of device 200 or a MAC address of a component of device 200 (such as processor 220). Non-transitory storage medium 230 may be or include a processor-readable storage medium that stores processor-executable wireless communication instructions 232 that, when executed by processor 220, cause device 200 to perform act 101 and, subject to criterion 110, acts 102 and 103 of method 100.

Since exemplary device 200 is a portable electronic device, device 200 includes an on-board power storage component 260 (e.g., one or more batteries) to provide electrical power as needed to port 251, transceiver 252, processor 220, and/or memory 230. Processor 220 may be any type of processor, including but not limited to: a digital microprocessor or microcontroller, an application-specific integrated circuit (ASIC), a field-programmable gate array (FPGA), a digital signal processor (DSP), a graphics processing unit (GPU), a programmable gate array (PGA), a programmable logic unit (PLU), or the like.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Method 100 provides an example of a method of establishing a wireless communications session between a first and a second electronic device, specifically from the point of view of the first electronic device. However, a person of skill in the art will appreciate that some acts performed by the first electronic device in method 100 may be dependent upon or responsive to various acts being performed by the second electronic device. Thus, the various embodiments described herein also provide methods of establishing a wireless communications session between a first and a second electronic device from the point of view of the second electronic device.

Figure 3:
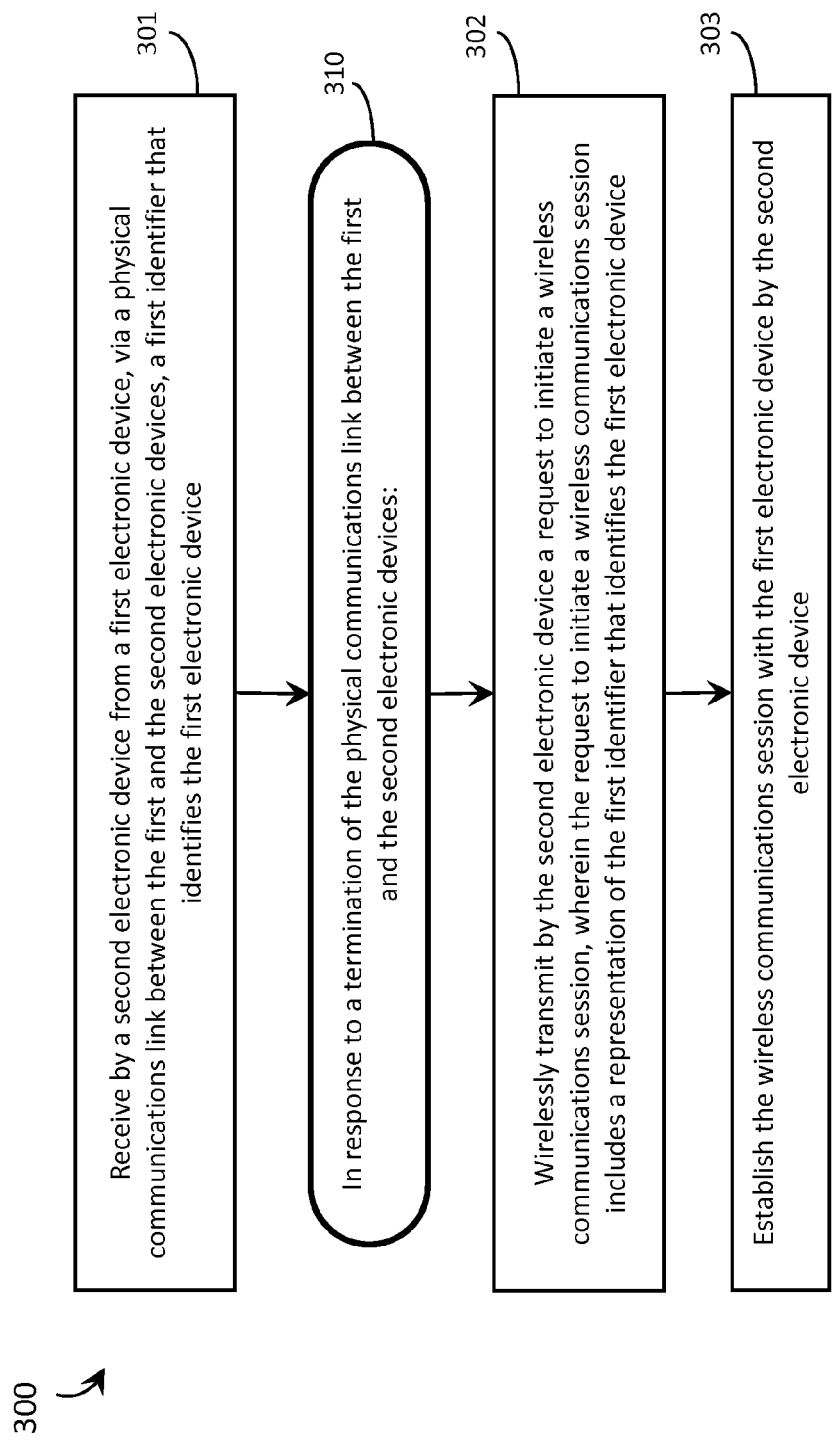
FIG. 3 is a flow-diagram showing a method of establishing wireless communications between a first electronic device and a second electronic device in accordance with the present systems, devices, and methods, from the point of view of the second electronic device.

FIG. 3 is a flow-diagram showing a method 300 of establishing wireless communications between a first electronic device and a second electronic device in accordance with the present systems, devices, and methods, from the point of view of the second electronic device. Method 300 may be viewed as a complement to method 100, where method 300 provides the acts performed by the second electronic device and method 100 provides the related acts performed by the first electronic device. Thus, many of the descriptions of acts 101, 102, and 103, as well as criterion 110, similarly apply in the context of method 300. For example, in method 300, the first electronic device may still advantageously include a portable electronic device (e.g., a wearable electronic device) and the second electronic device may include an electronic receiving device, such as a laptop computer, a personal computer, and/or a desktop computer.

Method 300 includes three acts 301, 302, and 303 (depicted by rectangular boxes in FIG. 3) and one criterion 310 (depicted by a rounded box in FIG. 3), where acts 302 and 303 are only performed when criterion 310 is satisfied. Thus, FIG. 3 depicts an implementation of method 300 for which criterion 310 is satisfied. Those of skill in the art will appreciate that in alternative embodiments certain acts and/or criteria may be omitted and/or additional acts and/or criteria may be added. Those of skill in the art will also appreciate that the illustrated order of the acts and criterion is shown for exemplary purposes only and may change in alternative embodiments.

At 301, the second electronic device (e.g., the personal computing device) receives a first identifier from the first electronic device via a physical communications link between the first and the second electronic devices. The first identifier identifies the first electronic device and may include, for example, a media access control ("MAC") address of the first electronic device (or of a component thereof, such as a processor thereof). As previously described, the first identifier may be stored in a non-transitory storage medium or memory of the first electronic device. In this case, receiving the first identifier from the first electronic device at 301 may include, for example, retrieving the first identifier by the second electronic device from the non-transitory storage medium of the first electronic device via the physical communications link between the first and the second electronic devices.

Act 301 begins the process of establishing a wireless connection between two electronic devices by making use of a physical, wired connection between the devices to deliver information relevant to wireless communications. By receiving (e.g., retrieving, as described above) the first identifier via the physical communications link between the first and the second electronic devices, the second electronic device effectively "discovers" the first electronic device through a wired connection as opposed to through a conventional wireless discovery process. Thus, act 301 quickly accomplishes (or even bypasses) at least a portion of the conventional discovery process and enables the second electronic device to immediately transmit wireless signals that are configured to be accessed by the first electronic device without the second electronic device first having to "wirelessly discover" the first electronic device or explore the wireless signal space to pick out and identify the first electronic device.

At 310, a criterion is specified and this criterion must be met before method 300 proceeds to act 302. The criterion is that the physical communications link between the first and the second electronic devices must be terminated. Method 300 only proceeds to acts 302 and 303 in response to a termination of the physical communications link between the first and the second electronic devices. While acts 302 and 303 may be performed substantially autonomously by the second electronic device, criterion 310 may, in some implementations, involve the user physically unplugging a cable (e.g., a USB cable) from either or both of the first and/or the second electronic devices.

As previously described, FIG. 3 depicts an implementation of method 300 in which criterion 310 is satisfied. Accordingly, method 300 proceeds to act 302.

At 302, the second electronic device wirelessly transmits a request to initiate a wireless communications session. The request to initiate a wireless communications session includes a representation of (e.g., the entirety of, or data that is based on and/or representative of) the first identifier that was received by the second electronic device from the first electronic device at 301. Because wireless signals are typically transmitted in multiple directions (e.g., radiated, multicasted, etc.), it may not be technically correct to describe the request to initiate a wireless communications session as being transmitted to the first electronic device by the second electronic device; however, the inclusion of the representation of the first identifier in the request denotes that the request is intended for the first electronic device. In wireless connection terms, act 301 enables the second electronic device to readily discover the first electronic device and at 302 the second electronic device transmits a request to initiate a wireless communications session based on having discovered the first electronic device. Transmission of the request to initiate a wireless communications session at 302 is triggered in response to a termination of the physical communications link between the first and the second electronic devices because, in common implementations, two electronic devices are not typically capable of sustaining both a wired connection and a wireless connection between one another at the same time. However, a person of skill in the art will appreciate that in implementations that are capable of sustaining simultaneous wired and wireless connections, method 300 may be performed without reliance upon (or even the inclusion of) criterion 310.

In some applications, a user may prefer to manually control when the request to initiate a wireless communications session is transmitted by the second electronic device per act 302. In such applications, act 302 may not be performed autonomously, but rather act 302 may be manually triggered by the user by, for example, having the user click a "connect" button that causes the second electronic device to wirelessly transmit a request to initiate a wireless communications session with the first electronic device. Manual triggering of act 302 may or may not depend on criterion 310 being satisfied, depending on whether or not the devices involved are capable of simultaneously sustaining a wired connection and a wireless connection with one another.

At 303, the wireless communications session with the first electronic device is established by the second electronic device. In some implementations, the second electronic device may wirelessly receive an acceptance of the request to initiate the wireless communications session from the first electronic device (such acceptance being based on the inclusion of the first identifier in the request to initiate the wireless communications session), and the second electronic device may establish the wireless communications session in response to such acceptance. Upon acceptance of the request to initiate the wireless communications session, the two electronic devices become paired and/or connected and proceed to communicate wirelessly in accordance with known wireless communication protocols, such as Bluetooth®, WiFi®, Zigbee®, or the like.

As described in the context of act 101 of method 100, depending on the specific implementation, act 301 of method 300 may make use of an existing physical communications link between the first and the second electronic devices, or act 301 of method 300 may be triggered substantially autonomously in response to an establishing of (i.e., a formation or creation of) the physical communications link between the first and the second electronic devices. While it is an optional feature of the present systems, devices, and methods for any/all acts of method 300 to be carried out substantially autonomously by the second electronic device, FIG. 4 clearly illustrates an implementation of acts 301 and 302 from method 300 in which such acts are carried out substantially autonomously by the second electronic device.

Figure 4:
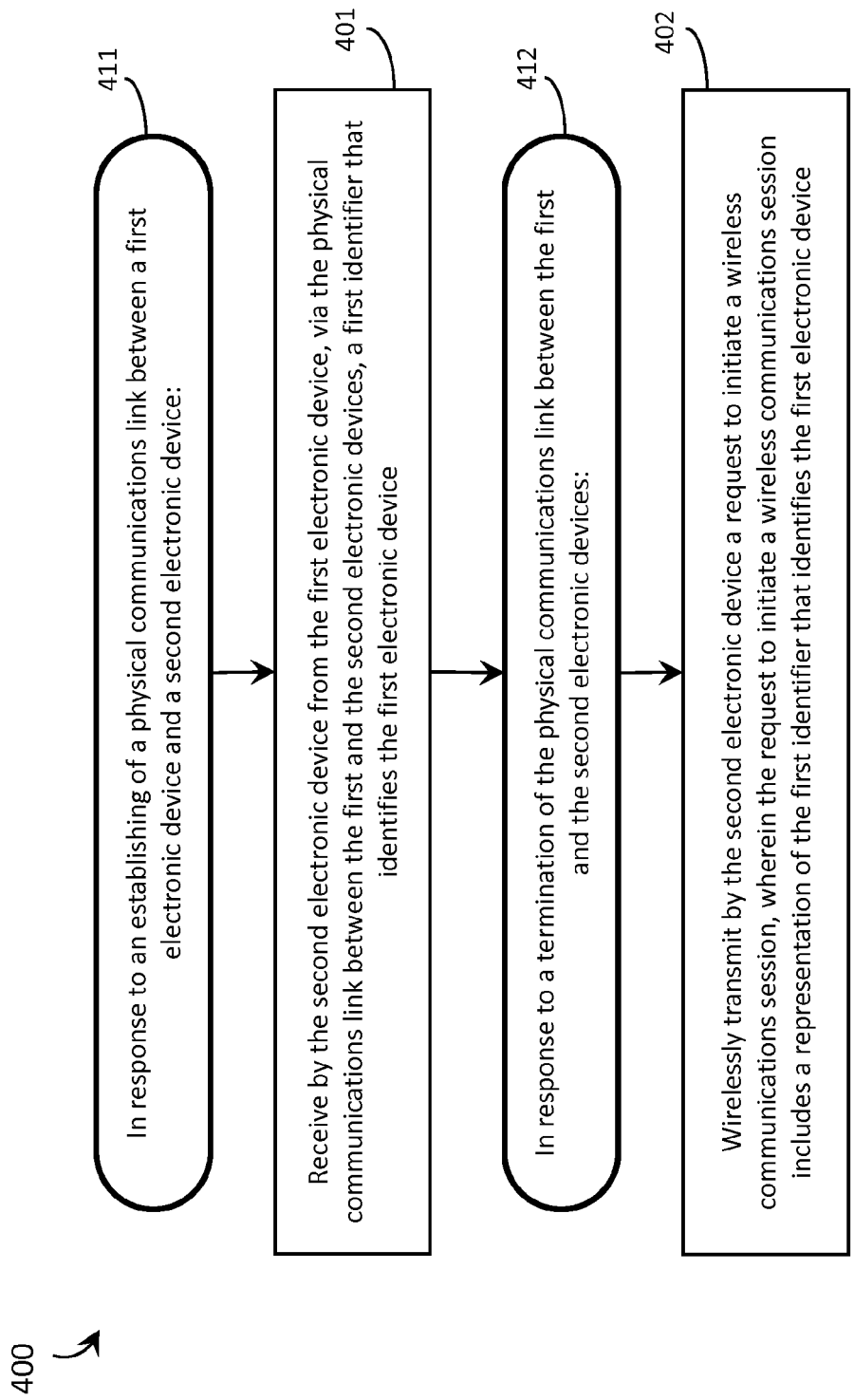
FIG. 4 is a flow-diagram showing a method of initiating wireless communications with a first electronic device by a second electronic device in accordance with the present systems, devices, and methods.

FIG. 4 is a flow-diagram showing a method 400 of initiating wireless communications with a first electronic device by a second electronic device in accordance with the present systems, devices, and methods. Method 400 is similar to method 300 from FIG. 3 but is slightly adjusted to emphasize the (optionally) autonomous and responsive nature of certain acts performed by the second electronic device. Accordingly, many of the descriptions of acts 301, 302, and 303, as well as criterion 310, similarly apply in the context of method 400. For example, in method 400, the first electronic device may still advantageously include a portable electronic device (e.g., a wearable electronic device) and the second electronic device may include an electronic receiving device, such as a laptop computer, a personal computer, and/or a desktop computer.

Method 400 includes two acts 401 and 402 (depicted by rectangular boxes in FIG. 4) and two criteria 411 and 412 (depicted by rounded boxes in FIG. 4). Act 401 is only performed when criterion 411 is satisfied and act 402 is only performed when act 401 is performed and criterion 412 is satisfied. Thus, FIG. 4 depicts an implementation of method 400 for which criteria 411 and 412 are both satisfied. Those of skill in the art will appreciate that in alternative embodiments certain acts and/or criteria may be omitted and/or additional acts and/or criteria may be added. Those of skill in the art will also appreciate that the illustrated order of the acts and criteria is shown for exemplary purposes only and may change in alternative embodiments.

At 411, a criterion is specified and this criterion must be met before method 400 proceeds to act 401. The criterion is that a physical communications link between the first and the second electronic devices must be established. Method 400 only proceeds to act 401 in response to an establishing of a physical communications link between the first and the second electronic devices. Thus, act 401 may be performed substantially autonomously by the second electronic device in response to, for example, a user physically plugging a cable (e.g., a USB cable) into the respective tethered connector ports of both of the first and the second electronic devices.

As previously described, FIG. 4 depicts an implementation of method 400 in which criterion 411 is satisfied. Accordingly, method 400 proceeds to act 401.

At 401, the second electronic device (e.g., the personal computing device) receives a first identifier from the first electronic device via a physical communications link between the first and the second electronic devices. The first identifier identifies the first electronic device and may include, for example, a media access control ("MAC") address of the first electronic device (or of a component thereof, such as a processor thereof). As previously described, the first identifier may be stored in a non-transitory storage medium or memory of the first electronic device. In this case, receiving the first identifier from the first electronic device at 401 may include, for example, retrieving the first identifier by the second electronic device from the non-transitory storage medium of the first electronic device via the physical communications link between the first and the second electronic devices, substantially autonomously in response to an establishing of the physical communications link per criterion 411.

At 412, a criterion is specified and this criterion must be met before method 400 proceeds to act 402. The criterion is that the physical communications link between the first and the second electronic devices must be terminated. Method 400 only proceeds to act 402 in response to a termination of the physical communications link between the first and the second electronic devices. Thus, act 402 may be performed substantially autonomously by the second electronic device in response to, for example, a user physically unplugging the cable (e.g., the USB cable) from either or both of the first and the second electronic devices.

As previously described, FIG. 4 depicts an implementation of method 400 in which criterion 412 is satisfied. Accordingly, method 400 proceeds to act 402.

At 402, the second electronic device wirelessly transmits a request to initiate a wireless communications session. The request to initiate a wireless communications session includes a representation of (e.g., the entirety of, or data that is based on and/or representative of) the first identifier that was received by the second electronic device from the first electronic device at 401. Transmission of the request to initiate a wireless communications session at 402 is triggered substantially autonomously by the second electronic device in response to a termination of the physical communications link between the first and the second electronic devices per criterion 412. With the transmission of the request, wireless communications are effectively "initiated" by the second electronic device and the first and second electronic devices may proceed to "establish" a wireless communications session as described in either or both of methods 100 and/or 300.

In principle, method 400 may be carried out using any wirelessly communicative electronic device as the second electronic device; however, method 400 is particularly advantageous in implementations in which the first electronic device is a portable electronic device, such as a wearable electronic device, and the second electronic device is a personal computing device, such as a laptop computer or a desktop computer. An illustrative example of an interaction between a wearable electronic device (i.e., a first electronic device) and a personal computing device (i.e., a second electronic device) that results in establishing a wireless communications session between the two devices in accordance with the present systems, devices, and methods is now provided.

Figure 5:
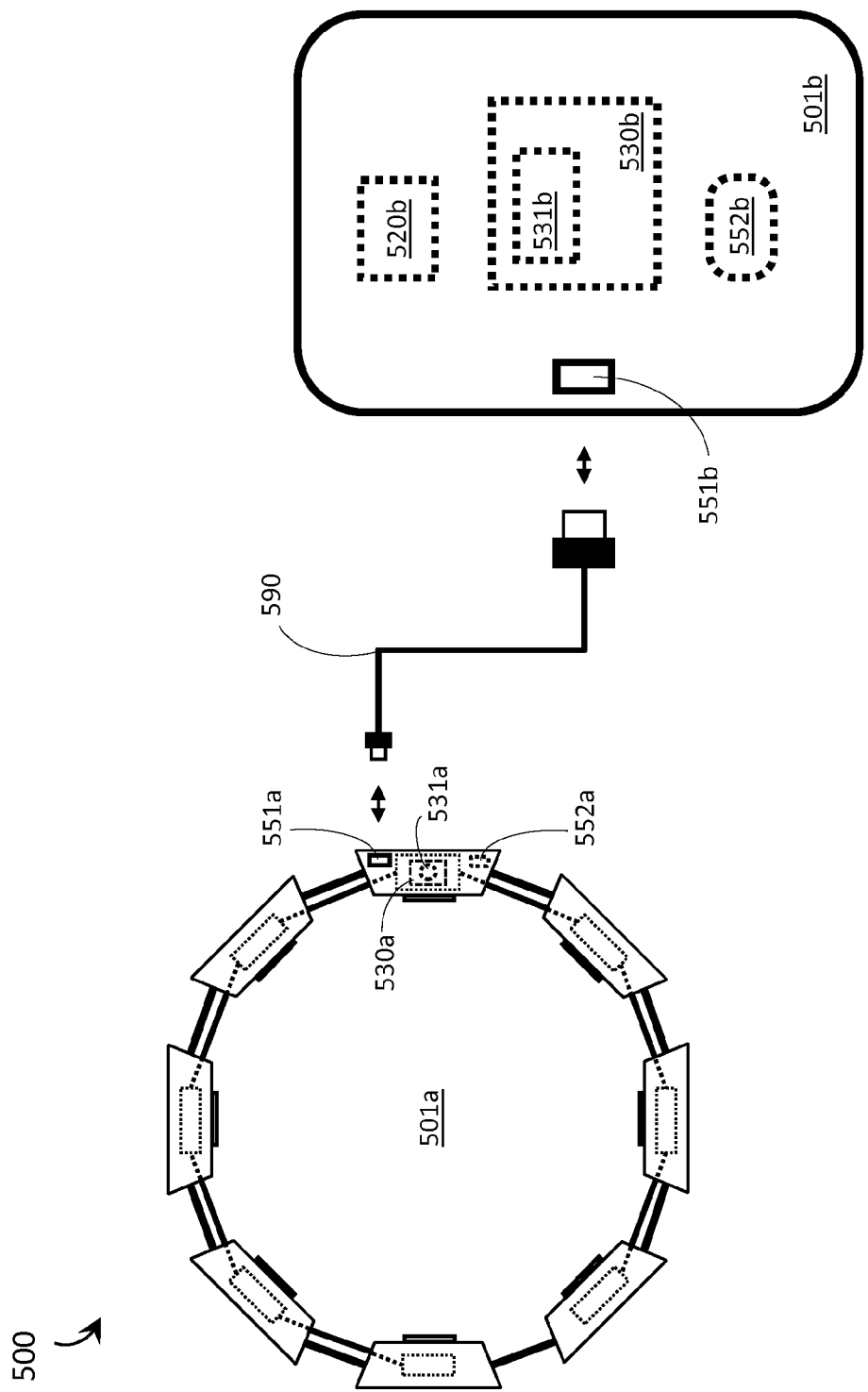
FIG. 5 is a schematic diagram of an electronic system that, in use, implements any or all of the methods from FIG. 1, FIG. 3, and/or FIG. 4 to establish wireless communications between two electronic devices in accordance with the present systems, devices, and methods.

FIG. 5 is a schematic diagram of an electronic system 500 that, in use, implements any or all of methods 100, 300, and/or 400 to establish wireless communications between two electronic devices in accordance with the present systems, devices, and methods. Electronic system 500 includes a first electronic device 501a and a second electronic device 501b. First electronic device 501a is a portable electronic device substantially similar to wearable gesture identification device 200 from FIG. 2 and may perform any or all of the acts attributed to the "first electronic device" in method 100. To this end, portable electronic device 501a includes a tethered connector port 551a, a wireless transceiver 552a, and a non-transitory storage medium or memory 530a that stores at least an identifier 531a (such as a MAC address) that identifies portable electronic device 501a. Portable electronic device 501a may or may not include a processor and any or all of tethered connector port 551a, wireless transceiver 552a, memory 530a, and/or an on-board processor (if included) may be communicatively coupled with one another.

Second electronic device 501b is a personal computing device (e.g., a laptop computer or a desktop computer) and may perform any or all of the acts attributed to the "second electronic device" in methods 300 and/or 400. Personal computing device 501b includes at least the minimum components necessary in order to carry out the acts attributed to "the second electronic device" in methods 300 and/or 400. Specifically, personal computing device 501b includes a tethered connector port 551b, a wireless transceiver 552b, a processor 520b, and a non-transitory processor-readable storage medium or memory 530b that stores at least processor-executable wireless communication instructions 531b. Instructions 531b may be executed by processor 520b to cause personal computing device 501b to perform any or all of the acts associated with the second electronic device in methods 300 and/or 400. Any or all of tethered connector port 551b, wireless transceiver 552b, processor 520b, and/or memory 530b may be communicatively coupled with one another. Other components that are typically associated with a personal computing device, such as a monitor, a keyboard, a mouse or touchpad, and so on, may be included in personal computing device 501b but are not illustrated in FIG. 5 to reduce clutter.

Some personal computing devices do not include a wireless transceiver, or may include a wireless transceiver that is not compatible with a particular wireless communications protocol (such as Bluetooth Low Energy). In such situations, wireless transceiver 551b may be in the form of a discrete component (such as a Bluetooth adapter or "dongle") that is communicatively coupled to personal computing device 501b via a second tethered connector port of personal computing device 501b (e.g., via a USB port).

In exemplary system 500, the tethered connector port 551a of portable electronic device 501a is a micro-USB port and the tethered connector port 551b of personal computing device 501b is a USB port. System 500 also includes a USB cable 590 having a micro-USB connector to mate with micro-USB port 551a and a USB connector to mate with USB port 551b. USB cable 590 provides an example of the "physical communications link" described in methods 100, 300, and 400 and thus insertion and removal of the respective connectors of cable 590 into/out of ports 551a and 551b may be integral in triggering certain acts involved in establishing wireless communications between devices 501a and 501b per the present systems, devices, and methods.

As described previously, portable electronic device 501a may be operative to establish wireless communications with personal computing device 501b by performing the acts of method 100, and likewise personal computing device 501b may be operative to establish or at least initiate wireless communications with portable electronic device 501a by performing the acts of method 300 and/or method 400. Most generally, both portable electronic device 501a (i.e., the first electronic device) and personal computing device 501b (i.e., the second electronic device) may respectively perform acts to establish wireless communications with one another as summarized in FIG. 6.

Figure 6:
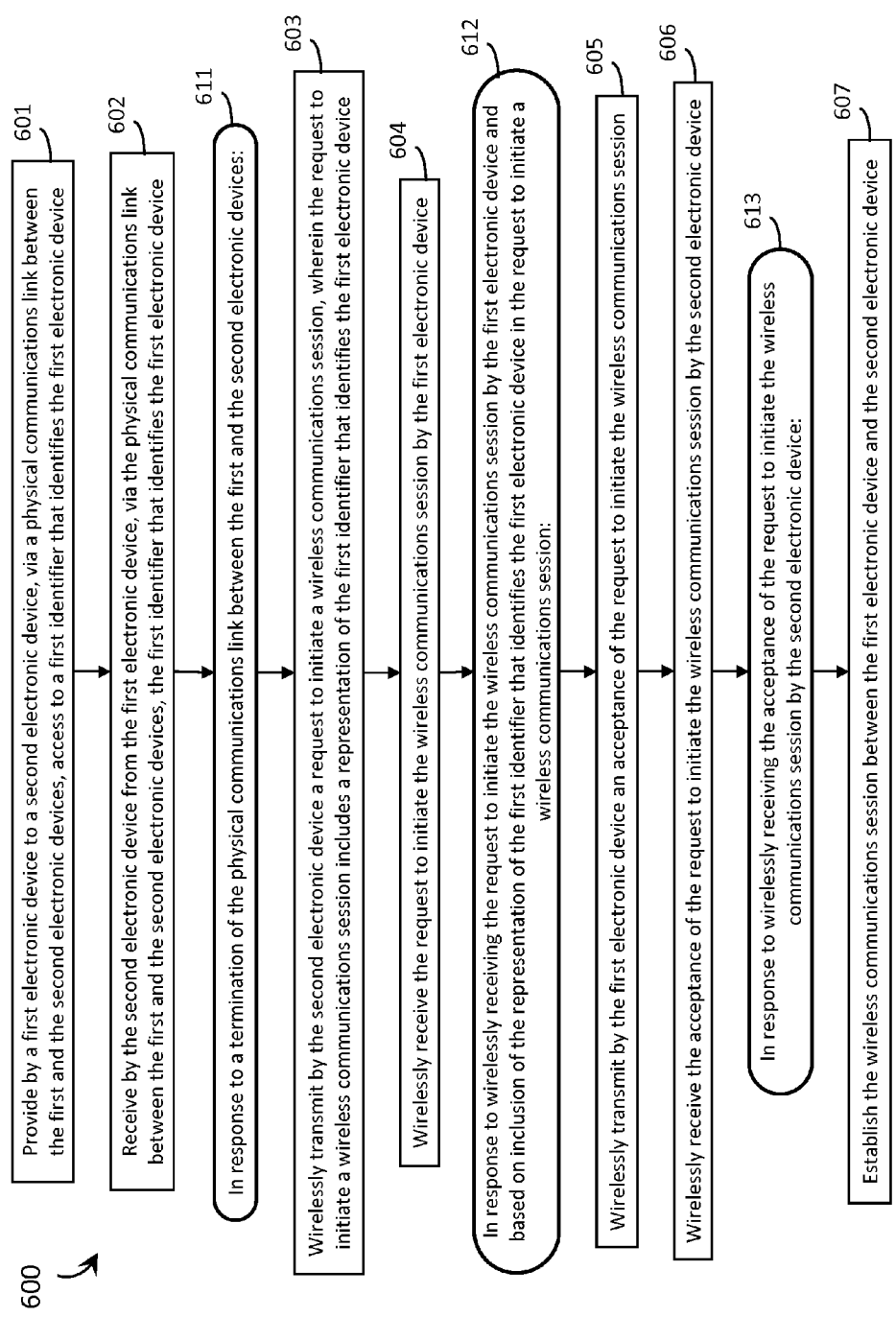
FIG. 6 is a flow-diagram showing a method of establishing wireless communications between a first electronic device and a second electronic device in accordance with the present systems, devices, and methods.

FIG. 6 is a flow-diagram showing a method 600 of establishing wireless communications between a first electronic device and a second electronic device in accordance with the present systems, devices, and methods. Method 600 may be viewed as a combination of method 100 and method 300 with the acts of method 100 being performed by the first electronic device and the acts of method 300 being performed by the second electronic device. Accordingly, many of the descriptions of the acts and criteria of methods 100 and 300 similarly apply in the context of method 600. For example, in method 600 the first electronic device may still advantageously include a portable electronic device (e.g., a wearable electronic device) and the second electronic device may include a personal computing device, such as a laptop computer or a desktop computer.

Method 600 includes seven acts 601, 602, 603, 604, 605, 606, and 607 (depicted by rectangular boxes in FIG. 6) and three criteria 611, 612, and 613 (depicted by rounded boxes in FIG. 6). Acts 603 and 604 are only performed when criterion 611 is satisfied, acts 605 and 606 are only performed when act 603 is performed and criterion 612 is satisfied, and act 607 is only performed when act 606 is performed and criterion 613 is satisfied. Thus, FIG. 6 depicts an implementation of method 600 for which criteria 611, 612, and 613 are all satisfied. Those of skill in the art will appreciate that in alternative embodiments certain acts and/or criteria may be omitted and/or additional acts and/or criteria may be added. Those of skill in the art will also appreciate that the illustrated order of the acts and criteria is shown for exemplary purposes only and may change in alternative embodiments. System 500 from FIG. 5 is an example of a system that may implement method 600. For the purposes of illustration, the description of method 600 that follows includes references to various elements from system 500 in parentheses.

At 601, the first electronic device (501a) provides the second electronic device (501b) with access to a first identifier (531a) via a physical communications link (590) between the first and the second electronic devices. Act 601 is substantially similar to act 101 from method 100, and as described for act 101, act 601 may in some implementations be triggered substantially autonomously in response to an establishing of the physical communications link (590) between the first and the second electronic devices. Such automatic triggering may be effected by the processor (520b) of the second electronic device (501b) based on, for example, executing wireless communication instructions (531b) stored in the second electronic device (501b).

At 602, the second electronic device (501b) receives the first identifier (531a) from the first electronic device (501a) via the physical communications link (590) between the first and the second electronic devices. Act 602 is substantially similar to act 301 from method 300, and may in some implementations be substantially similar to act 401 from method 400 (i.e., subject to criterion 411).

At 611, a criterion is specified and this criterion must be met before method 600 proceeds to act 603. The criterion is that the physical communications link (590) between the first and the second electronic devices must be terminated. Method 600 only proceeds to act 603 in response to a termination of the physical communications link (590) between the first and the second electronic devices. Criterion 611 is substantially similar to criterion 110 from method 100, criterion 310 from method 300, and criterion 412 from method 400.

At 603, the second electronic device (501b) wirelessly transmits (e.g., by a wireless transceiver 552b) a request to initiate a wireless communications session, where the request includes a representation of the first identifier (531a) that the second electronic device (501b) received at 602. Act 603 is substantially similar to act 302 from method 300 and act 402 from method 400.

At 604, the first electronic device (501a) wirelessly receives (e.g., by a wireless transceiver 552a) the request to initiate the wireless communications session that was wirelessly transmitted by the second electronic device (501b) at 603. Act 604 is substantially similar to act 102 from method 100.

At 612, a criterion is specified and this criterion must be met before method 600 proceeds to act 605. The criterion is that the request to initiate a wireless communications session must be received by the first electronic device (501a) and the request must include the first identifier (531a) that identifies the first electronic device (501a). Method 600 only proceeds to act 605 in response to the first electronic device (501a) identifying that the first identifier (531a) is included in the request to initiate a wireless communications session that the first electronic device (501a) received from the second electronic device (501b) at act 604.

At 605, the first electronic device (501a) wirelessly transmits (e.g., by wireless transceiver 552a) an acceptance of the request to initiate a wireless communications session. As per criterion 612, this acceptance is based on the inclusion of the first identifier (531a, or a representation thereof) in the request itself. Act 605 is substantially similar to an exemplary implementation of act 103 previously described for method 100.

At 606, the second electronic device (501b) wirelessly receives (e.g., by wireless transceiver 552b) the acceptance wirelessly transmitted by the first electronic device (501a) at act 605. Act 606 is substantially similar to an exemplary implementation of act 303 previously described for method 300.

At 613, a criterion is specified and this criterion must be met before method 600 proceeds to act 607. The criterion is that the acceptance of the request to initiate a wireless communications session must be received by the second electronic device (501b). Method 600 only proceeds to act 607 in response to the second electronic device (501b) receiving the acceptance of the request to initiate a wireless communications session that the first electronic device (501a) transmitted at act 605.

At 607, the wireless communications session is established between the first electronic device (501a) and the second electronic device (501b), meaning that the first electronic device (501a) and the second electronic device (501b) are "paired" and/or "connected" and may wirelessly exchange information in a substantially private, closed fashion (in the absence of reverse engineering the wireless signals) in accordance with conventional wireless communication protocols, such as Bluetooth, WiFi, Zigbee, etc.

As previously described, the various embodiments of systems, devices, and methods that establish wireless communications described above are distinct from conventional approaches because they make use of a physical communications link (i.e., a wired connection, like a USB connection) to quickly and privately transmit device identity information from one device to another. The device identity information is then immediately used in a pairing or "wireless connection establishment" process that is triggered when the physical communications link (e.g., USB connection) is terminated. This concept of "pairing over USB" greatly simplifies the initiation and establishment of a wireless communications session because it eliminates the need for the devices to "discover" one another and for the user to select/confirm that the correct device(s) have been discovered. A particular use case in which this approach is advantageous is provided in exemplary electronic system 500, where wireless communications are established between a portable electronic device 501a and a personal computing device 501b. In this case, portable electronic device 501a is a human-computer interface device that may use the wireless communications session to control personal computing device 501b. However, portable electronic device 501a also already uses a physical communications link with personal computing device 501b for various purposes, such as charging one or more batteries (260) on-board device 501a, running diagnostics on device 501a, installing data, software, or firmware on device 501a, and so on. In particular, some or all of these purposes may be necessary as soon as portable electronic device 501a is first activated. Given that portable electronic device 501a requires a wireless connection with personal computing device 501b for operation, and that portable electronic device 501a requires a wired connection with personal computing device 501b in order to be first initialized, it is particularly advantageous to substantially autonomously establish a wireless communications session between the two devices in response to establishing and then terminating the physical communications link (i.e., wired connection) therebetween that is first used to initialize portable electronic device 501a.

As described above, a portable electronic device may rely on a physical communications link with another electronic device, such as a personal computing device, for initial setup (i.e., "out of the box") and charging. A portable electronic device typically includes at least one on-board power storage component (e.g., battery), and the device is typically shipped by the manufacturer in one of two states: either with the power storage component charged or empty. In the case of the power storage component being charged, the stored power is typically gradually consumed over time so the end-user is likely to receive the device in its "empty" or "without on-board power" state by the time the end-user purchases and unboxes the device. This has the undesirable consequence of forcing the user to wait for the device to charge before the device can be used, and can also cause the execution of some of the substantially autonomous wireless communication methods described herein to be delayed until the portable electronic device has access to sufficient power. For at least these reasons, it is advantageous to ship (i.e., from the manufacturer to the end-user, through any number of intervening consignees or distributors) a portable electronic device in a "deep sleep" mode in which at least one power storage component of the device is at least partially charged but the power storage component is electrically/logically decoupled from consumptive elements of the portable electronic device. The various embodiments described herein include systems, devices, and methods for substantially autonomously activating an electronic device out of a deep sleep mode in response to an establishing of a physical communications link (i.e., a wired connection) between the electronic device and a source of electric power (such as another electronic device).

Figure 7:
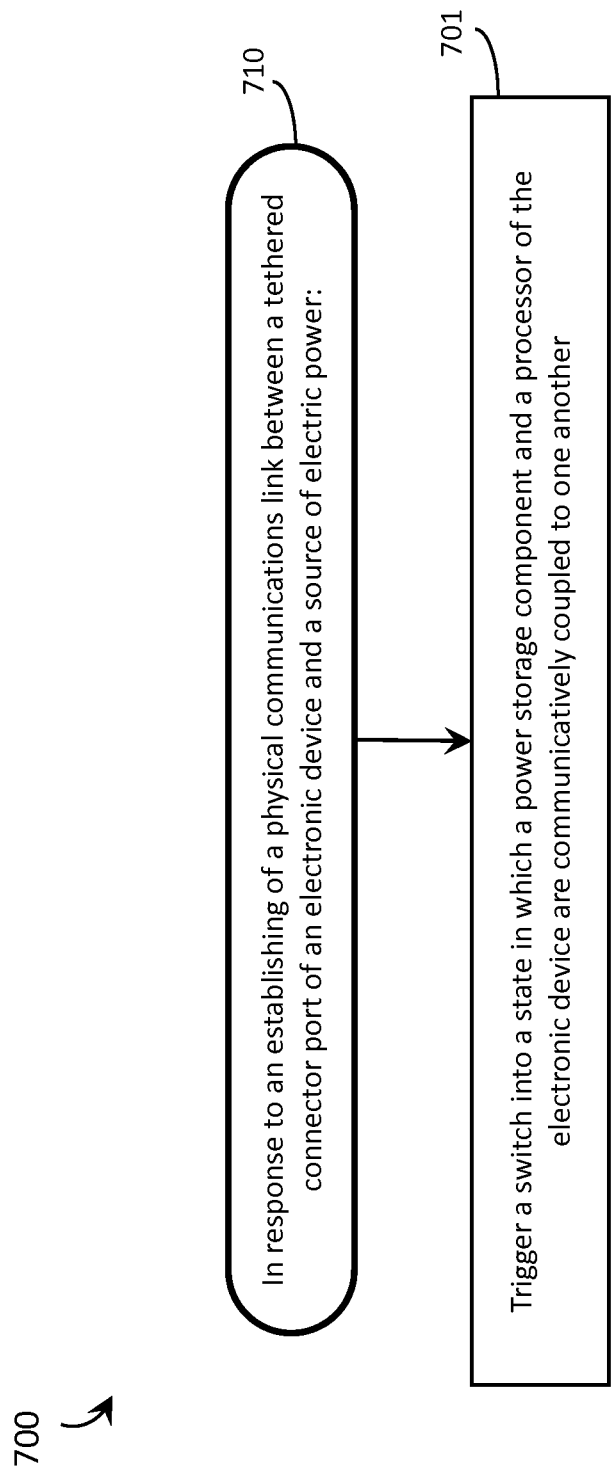
FIG. 7 is a flow-diagram showing a method of activating a portable electronic device out of deep sleep in accordance with the present systems, devices and methods.

FIG. 7 is a flow-diagram showing a method 700 of activating a portable electronic device out of deep sleep in accordance with the present systems, devices and methods. In order to carry out method 700, the portable electronic device includes a processor (e.g., a microprocessor or microcontroller), a power storage component (e.g., a battery), a tethered connector port communicatively coupled to the processor, and a switch that is communicatively coupleable to both the processor and the power storage component. The switch is controllably switchable between a first state in which the power storage component and the processor are communicatively isolated from one another and a second state in which the power storage component and the processor are communicatively coupled to one another. The portable electronic device is in a deep sleep mode in which i) the power storage component is at least partially charged, and ii) the switch is in the first state in which the power storage component and the processor are communicatively isolated from one another.

Method 700 includes one act 701 (depicted by a rectangular box in FIG. 7) and one criterion 710 (depicted by a rounded box in FIG. 7). Act 701 is only performed when criterion 710 is satisfied; thus, FIG. 7 depicts an implementation of method 700 for which criterion 710 is satisfied. Those of skill in the art will appreciate that in alternative embodiments certain acts and/or criteria may be omitted and/or additional acts and/or criteria may be added.

At 710, a criterion is specified and this criterion must be met before method 700 proceeds to act 701. The criterion is that a physical communications link must be established between the portable electronic device and a source of electric power. The source of electric power may be a wall power outlet or it may be another electronic device (such as a personal computing device), and the physical communications link may be in the form of a communicative cable, such as a USB cable. Method 700 only proceeds to act 701 in response to an establishing of the physical communications link between the portable electronic device and a source of electric power.

At 701, the switch is triggered into the second state in which the power storage component and the processor are communicatively coupled to one another. Triggering of the switch is accomplished in direct response to the establishing of the physical communications link between the portable electronic device and the source of electric power. As an example, the switch may be triggered when a (micro-)USB cable is plugged into the tethered connector port of the portable electronic device and the tethered connector port receives power via the USB cable. In order for the tethered connector port to receive power via the USB cable, the USB cable must also be plugged into a tethered connector port of the source of electric power (e.g., a USB port of a personal computing device).

Wearable gesture identification device 200 from FIG. 2 also serves as an example of a portable electronic device operative to substantially autonomously activate out of deep sleep in response to establishing a physical communications link in accordance with the present systems, devices, and methods. Returning to FIG. 2, device 200 includes a power control circuit 240 that communicatively couples to the processor 220, the power storage component (e.g., battery) 260, and the tethered connector port 251. Power control circuit 240 includes the switch described in method 700. In response to a (micro-)USB cable being plugged into tethered connector port 251, with the other end of the cable being plugged into a source of electric power such as a personal computing device, device 200 performs act 701 and the switch in power control circuit 240 activates device 200 out of deep sleep by communicatively coupling processor 220 to power storage component 260. More details of an exemplary power control circuit 240 are now described.

Figure 8:
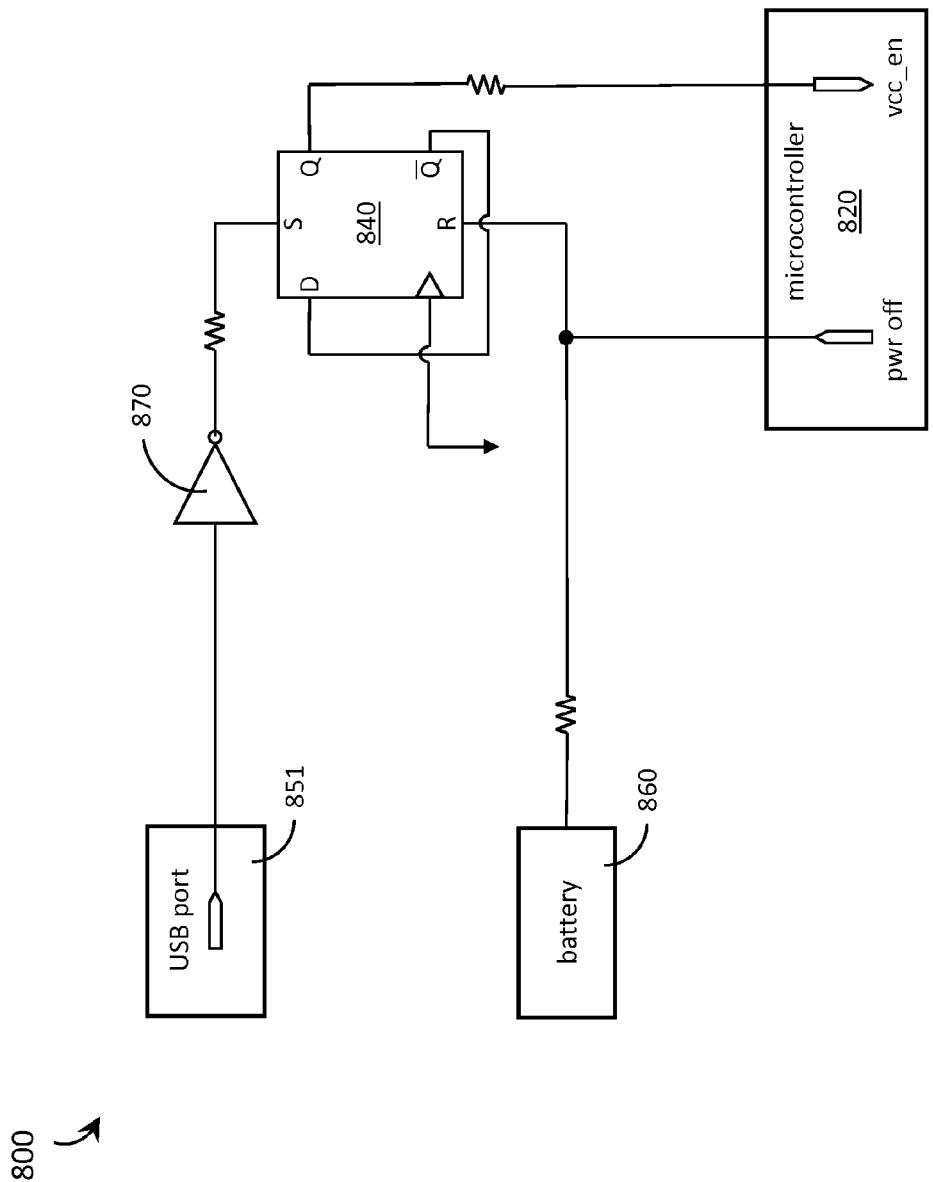
FIG. 8 is an illustrative schematic diagram of a power control circuit that substantially autonomously activates an electronic device out of deep sleep in response to an establishing of a physical communications link with a source of electric power in accordance with the present systems, devices, and methods.

FIG. 8 is an illustrative schematic diagram of a power control circuit 800 that substantially autonomously activates an electronic device out of deep sleep in response to an establishing of a physical communications link with a source of electric power in accordance with the present systems, devices, and methods. Power control circuit 800 provides an example of an implementation of circuit 240 from device 200. A person of skill in the art will appreciate that FIG. 8 is a simplified illustration of a circuit schematic and many details of circuit 800 are not shown for ease of illustration and to reduce clutter.

Circuit 800 includes a tethered connector port (e.g., a USB port) 851 (analogous to port 251 of device 200 in FIG. 2), a power storage component (e.g., a battery) 860 (analogous to power storage component 260 of device 200 in FIG. 2), and a processor (e.g., a microcontroller) 820 (analogous to processor 220 of device 200 in FIG. 2), all of which are communicatively coupled to a switch 840. In the illustrated example, switch 840 is a D flip-flop, though a person of skill in the art will appreciate that in alternative implementations a different form of switch may be employed. A brief description of the operation of exemplary circuit 800 is now provided, though a person of skill in the art will appreciate that circuit 800 is provided only as an example of a power control circuit that may be implemented to perform method 700 and that method 700 may be performed using other forms of power control circuits.

With battery 860 at least partially charged (e.g., at the point of manufacture of a device that includes circuit 800, such as device 200), microcontroller 820 may enter the device into deep sleep by triggering the "pwr off" signal illustrated in FIG. 8. This "pwr off" signal enters switch 840 into the previously-described "first state" in which battery 860 and microcontroller 820 are communicatively isolated from one another (a person of skill in the art will appreciate that battery 860 may still be communicatively coupled to switch 840 via paths not illustrated in FIG. 8 in order to provide power to switch 840). With the device (e.g., device 200) in deep sleep, the manufacturer may ship the device. When the device is received by an end-user, the user activates the device out of deep sleep by connecting USB port 851 to a source of electric power, such as to a personal computing device, through a USB cable (i.e., a physical communications link). The presence of electric power at USB port 851 substantially autonomously triggers switch 840 into its second state in which battery 860 is communicatively coupled to microcontroller 820. Specifically, an output of battery 860 is routed through switch 840 and communicatively coupled to input "vcc_en" of microcontroller 820. Receipt of power at vcc_en toggles microcontroller 820 out of deep sleep and activates the device. Exemplary component 870 is a "Schmitt trigger" that is used to remove noise from and essentially digitize the power signal coming from USB port 851.

As previously described, circuit 800 may be modified in many different ways and still provide the functionality necessary to perform method 700. As an example, circuit 800 may be extended to include at least one user-actuated button to enable the user to activate the corresponding device out of deep sleep without relying on establishing a physical communications link with a source of electric power. Such a button may, for example, interrupt the coupling between ground and the ">" input of switch 840 in conjunction with a parallel coupling between the ">" input of switch 840 and the battery 860.

The various embodiments described herein provide systems, devices, and methods for establishing wireless communications and for activating out of deep sleep, both in response to establishing/terminating a physical communications link. While these concepts may be applied in any electronic devices, they are particularly advantageous when applied in portable electronic devices. Most portable electronic devices available today rely on a physical communications link with a personal computing device for at least some aspect(s) of their operation (e.g., charging power, updating or configuring software/firmware, and so on). In particular, establishing a physical communications link with a personal computing device is commonly the first thing a user is instructed to do with a new portable electronic device right out of the box (at least for purposes of charging the device and/or installing updates that may have become available since the device was packaged by the manufacturer). For portable electronic devices that also make use of wireless communications with the personal computing device for at least some function(s) (such as interface devices like exemplary device 200), it is particularly advantageous to combine the technique(s) for establishing wireless communications and the technique(s) for activating out of deep sleep described herein. Such a combination can greatly facilitate the out-of-box initialization process and thereby enhance the overall user experience of operating such a portable electronic device.

As examples of the combination described above, methods 100, 300, 400, 600, and 700 are now revisited. Returning to FIG. 1, method 100 may be extended to include receiving electric power from the second electronic device by the first electronic device via the physical communications link between the first and the second electronic devices. In response to receiving this electric power, the first electronic device may wake from deep sleep (e.g., by performing act 701 of method 700) and then proceed to perform acts 101, 102, and 103.

Returning to FIG. 3 and FIG. 4, method 300 and method 400 may both be extended to include transmitting electric power from the second electronic device to the first electronic device via the physical communications link between the first and the second electronic devices, and (as a result thereof) causing the first electronic device to wake from a deep sleep mode.

Returning to FIG. 6, method 600 may be extended to include transmitting electric power from the second electronic device via the physical communications link between the first and the second electronic devices and receiving electric power by the first electronic device via the physical communications link between the first and the second electronic devices. In response to receiving this electric power, the first electronic device may wake from a deep sleep mode (e.g., by performing act 701 of method 700) and then proceed to perform acts 601, 604, 605, and 607.

Returning to FIG. 7, the portable electronic device may include a wireless transceiver and method 700 may be extended to include all of method 100. Specifically, method 700 may be extended to include acts 101, 102, and 103, as well as criterion 110, of method 100.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other electronic devices, not necessarily the exemplary wearable electronic devices and/or personal computing devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any non-transitory processor-readable medium for use by or in connection with any processor-related system or method. In the context of this disclosure, a non-transitory memory is an electronic, magnetic, optical, or other physical device or means that may be processor-readable and may contain or store a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The non-transitory medium can be, for example, but is not limited to, an electronic, magnetic, optical, electromagnetic, infrared, or semiconductor system, apparatus or device. More specific examples (a non-exhaustive list) of the non-transitory medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to: U.S. Provisional Patent Application Ser. No. 62/085,385, U.S. Non-Provisional patent application Ser. No. 14/186,889 (now US Patent Application Publication No. 2014-0240103), U.S. Non-Provisional patent application Ser. No. 14/276,575 (now US Patent Application Publication No. 2014-0334083), U.S. Provisional Patent Application Ser. No. 61/909,786 (now US Patent Application Publication No. 2015-0148641), U.S. Provisional Patent Application Ser. No. 62/031,651 (now US Patent Application Publication No. 2015-0234426), U.S. Provisional Patent Application Ser. No. 61/971,346 (now US Patent Application Publication No. 2015-0277575), and U.S. Non-Provisional patent application Ser. No. 14/465,194 (now US Patent Application Publication No. 2015-0057770), are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of establishing wireless communications between a first electronic device and a second electronic device, the method comprising:
    transmitting electric power from the second electronic device to the first electronic device via a physical communications link between the first and the second electronic devices;
    causing the first electronic device to wake from a deep sleep mode in which: i) a power storage component of the first electronic device is at least partially charged, and ii) a switch that is communicatively coupleable to both the power storage component and a processor of the first electronic device is in a first state in which the power storage component and the processor are communicatively isolated from one another, wherein causing the first electronic device to wake from the deep sleep mode includes triggering the switch into a second state in which the power storage component and the processor are communicatively coupled to one another;
    receiving by the second electronic device from the first electronic device, via the physical communications link between the first and the second electronic devices, a first identifier that identifies the first electronic device;
    in response to a termination of the physical communications link between the first and the second electronic devices, wirelessly transmitting by the second electronic device a request to initiate a wireless communications session, wherein the request to initiate a wireless communications session includes a representation of the first identifier that identifies the first electronic device; and
    establishing the wireless communications session with the first electronic device by the second electronic device.

2. The method of claim 1 wherein receiving by the second electronic device from the first electronic device, via the physical communications link between the first and the second electronic devices, a first identifier that identifies the first electronic device includes retrieving the first identifier by the second electronic device from a non-transitory storage medium of the first electronic device via the physical communications link between the first and the second electronic devices.

3. The method of claim 1 wherein receiving by the second electronic device from the first electronic device, via the physical communications link between the first and the second electronic devices, a first identifier that identifies the first electronic device includes receiving by the second electronic device from the first electronic device, via the physical communications link between the first and the second electronic devices, a media access control ("MAC") address of the first electronic device.

4. The method of claim 1, further comprising:
    wirelessly receiving by the second electronic device an acceptance of the request to initiate the wireless communications session by the first electronic device based on inclusion of the representation of the first identifier that identifies the first electronic device in the request to initiate the wireless communications session.

5. The method of claim 1 wherein receiving by the second electronic device from the first electronic device, via the physical communications link between the first and the second electronic devices, a first identifier that identifies the first electronic device includes receiving by the second electronic device from the first electronic device, via the physical communications link between the first and the second electronic devices, the first identifier that identifies the first electronic device in response to an establishing of the physical communications link between the first and the second electronic devices.

6. A method of initiating wireless communications with a first electronic device by a second electronic device, the method comprising:
    in response to an establishing of a physical communications link between the first and the second electronic devices;

transmitting electric power from the second electronic device to the first electronic device via the physical communications link between the first and the second electronic devices;

causing the first electronic device to wake from a deep sleep mode in which: i) a power storage component of the first electronic device is at least partially charged, and ii) a switch that is communicatively coupleable to both the power storage component and a processor of the first electronic device is in a first state in which the power storage component and the processor are communicatively isolated from one another, wherein causing the first electronic device to wake from the deep sleep mode includes triggering the switch into a second state in which the power storage component and the processor are communicatively coupled to one another; and receiving by the second electronic device from the first electronic device, via the physical communications link between the first and the second electronic devices, a first identifier that identifies the first electronic device; and in response to a termination of the physical communications link between the first and the second electronic devices, wirelessly transmitting by the second electronic device a request to initiate a wireless communications session, wherein the request to initiate a wireless communications session includes a representation of the first identifier that identifies the first electronic device.

7. The method of claim 6 wherein receiving by the second electronic device from the first electronic device, via the physical communications link between the first and the second electronic devices, a first identifier that identifies the first electronic device includes retrieving the first identifier by the second electronic device from a non-transitory storage medium of the first electronic device via the physical communications link between the first and the second electronic devices.

8. The method of claim 6 wherein receiving by the second electronic device from the first electronic device, via the physical communications link between the first and the second electronic devices, a first identifier that identifies the first electronic device includes receiving by the second electronic device from the first electronic device, via the physical communications link between the first and the second electronic devices, a media access control ("MAC") address of the first electronic device.

9. A method of establishing wireless communications between a first electronic device and a second electronic device, the method comprising:

receiving electric power from the second electronic device by the first electronic device via a physical communications link between the first and the second electronic devices;

in response to receiving electric power from the second electronic device by the first electronic device via the physical communications link between the first and the second electronic devices, waking from a deep sleep mode by the first electronic device, wherein in the deep sleep mode: i) a power storage component of the first electronic device is at least partially charged, and ii) a switch that is communicatively coupleable to both the power storage component and a processor of the first electronic device is in a first state in which the power storage component and the processor are communicatively isolated from one another, and wherein waking from the deep sleep mode by the first electronic device includes triggering the switch into a second state in which the power storage component and the processor are communicatively coupled to one another;

providing by the first electronic device to the second electronic device, via the physical communications link between the first and the second electronic devices, a first identifier that identifies the first electronic device;

in response to a termination of the physical communications link between the first and the second electronic devices, wirelessly receiving by the first electronic device from the second electronic device a request to initiate a wireless communications session, wherein the request to initiate a wireless communications session includes a representation of the first identifier that identifies the first electronic device; and establishing the wireless communications session with the second electronic device by the first electronic device.

10. The method of claim 9 wherein providing by the first electronic device to the second electronic device, via the physical communications link between the first and the second electronic devices, a first identifier that identifies the first electronic device includes providing the second electronic device access to a non-transitory storage medium of the first electronic device via the physical communications link between the first and the second electronic devices.

11. The method of claim 9 wherein providing by the first electronic device to the second electronic device, via the physical communications link between the first and the second electronic devices, a first identifier that identifies the first electronic device includes providing by the first electronic device to the second electronic device, via the physical communications link between the first and the second electronic devices, a media access control ("MAC") address of the first electronic device.

12. The method of claim 9 wherein establishing the wireless communications session with the second electronic device by the first electronic device includes wirelessly transmitting by the first electronic device an acceptance of the request to initiate the wireless communications session by the first electronic device based on inclusion of the representation of the first identifier that identifies the first electronic device in the request to initiate the wireless communications session.

13. The method of claim 9 wherein providing by the first electronic device to the second electronic device, via the physical communications link between the first and the second electronic devices, a first identifier that identifies the first electronic device includes providing by the first electronic device to the second electronic device, via the physical communications link between the first and the second electronic devices, the first identifier that identifies the first electronic device in response to an establishing of the physical communications link between the first and the second electronic devices.

14. A method of establishing wireless communications between a first electronic device and a second electronic device, the method comprising:

transmitting electric power from the second electronic device via a physical communications link between the first and the second electronic devices;

receiving electric power by the first electronic device via the physical communications link between the first and the second electronic devices;

in response to receiving electric power by the first electronic device via the physical communications link between the first and the second electronic devices, waking from a deep sleep mode by the first electronic device, wherein in the deep sleep mode: i) a power storage component of the first electronic device is at least partially charged, and ii) a switch that is communicatively coupleable to both the power storage component and a processor of the first electronic device is in a first state in which the power storage component and the processor are communicatively isolated from one another, and wherein waking from the deep sleep mode by the first electronic device includes triggering the switch into a second state in which the power storage component and the processor are communicatively coupled to one another;

providing by the first electronic device to the second electronic device, via the physical communications link between the first and the second electronic devices, access to a first identifier that identifies the first electronic device;

receiving by the second electronic device from the first electronic device, via the physical communications link between the first and the second electronic devices, the first identifier that identifies the first electronic device;

in response to a termination of the physical communications link between the first and the second electronic devices, wirelessly transmitting by the second electronic device a request to initiate a wireless communications session, wherein the request to initiate a wireless communications session includes a representation of the first identifier that identifies the first electronic device;

wirelessly receiving the request to initiate the wireless communications session by the first electronic device;

in response to wirelessly receiving the request to initiate the wireless communications session by the first electronic device and based on inclusion of the representation of the first identifier that identifies the first electronic device in the request to initiate a wireless communications session, wirelessly transmitting by the first electronic device an acceptance of the request to initiate the wireless communications session;

wirelessly receiving the acceptance of the request to initiate the wireless communications session by the second electronic device; and in response to wirelessly receiving the acceptance of the request to initiate the wireless communications session by the second electronic device, establishing the wireless communications session between the first electronic device and the second electronic device.

15. The method of claim 14 wherein providing by the first electronic device to the second electronic device, via the physical communications link between the first and the second electronic devices, a first identifier that identifies the first electronic device includes providing by the first electronic device to the second electronic device, via the physical communications link between the first and the second electronic devices, the first identifier that identifies the first electronic device in response to an establishing of the physical communications link between the first and the second electronic devices.

* * * * *